US005689628A

United States Patent [19]
Robertson

[11] Patent Number: 5,689,628
[45] Date of Patent: *Nov. 18, 1997

[54] COUPLING A DISPLAY OBJECT TO A VIEWPOINT IN A NAVIGABLE WORKSPACE

[75] Inventor: George G. Robertson, Foster City, Calif.

[73] Assignee: Xerox Corporation, Stamford, Conn.

[*] Notice: The term of this patent shall not extend beyond the expiration date of Pat. No. 5,608,850.

[21] Appl. No.: 227,763

[22] Filed: Apr. 14, 1994

[51] Int. Cl.⁶ .................................................. G06F 15/00
[52] U.S. Cl. ............................................. 395/127; 395/355
[58] Field of Search .................. 395/118–121, 127, 395/133, 134, 155, 157, 158, 160, 161

[56] References Cited

U.S. PATENT DOCUMENTS

| | | | |
|---|---|---|---|
| 5,050,105 | 9/1991 | Peters | 345/119 |
| 5,230,063 | 7/1993 | Hoeber et al. | 395/156 |
| 5,276,785 | 1/1994 | Mackinlay et al. | 395/127 |
| 5,359,703 | 10/1994 | Robertson et al. | 395/119 |
| 5,367,623 | 11/1994 | Iwai et al. | 395/157 |
| 5,404,442 | 4/1995 | Foster et al. | 395/159 |
| 5,422,993 | 6/1995 | Fleming | 395/159 |
| 5,513,303 | 4/1996 | Robertson et al. | 395/119 |

OTHER PUBLICATIONS

Fitzmaurice, "Situated information spaces and spatially aware palmtop computers", Comm. of the ACM, v. 36, n. 7, pp. 39–49, Jul. 1993.

Robertson, Card and Mackinlay in "Information Visualization Using 3D Interactive Animation", Communications ACM, 36, 4, Apr. 1993, pp. 57–71.

Card., S., Robertson, G, and Mackinlay, J., "The Information Visualizer, An Information Workspace," Proceedings of SIGCHI '91, 1991, pp. 181–188.

(List continued on next page.)

*Primary Examiner*—Heather R. Herndon
*Assistant Examiner*—Joseph R. Burwell
*Attorney, Agent, or Firm*—Judith C. Bares

[57] ABSTRACT

A method and system are disclosed for maintaining a view of a selected display object while navigating in an n-dimensional, navigable workspace. Objects perceptible in the workspace are perceptible as viewed from one of a plurality of viewpoints of the workspace. In response to the system user selecting a display object for coupling, the selected display object is moved to a preferred viewing position and coupled to a first viewpoint into the workspace that is the viewpoint into the workspace at the time the object is selected. In response to the user's subsequent requests to change viewpoints into the workspace to perform navigation therein, the display object appears to maintain the same relative position to the first viewpoint. This results in the selected display object always being easily perceptible and accessible in the workspace even if the selected display object would not otherwise be perceptible from one of the changed viewpoints in the workspace. The display object coupling technique is useful in large 2D, 2½D and 3D visualization workspaces, such as, for example, to carry a display object that serves as a tool or that contains information that needs to be referenced to a portion of the workspace that is presently not clearly perceptible. The selected display object may either be perceptible in the workspace at the time of selection, or it may be made perceptible in response to the user's selection of an operation or function available in the workspace. In response to receiving a decoupling signal, the selected display object is returned to its original position in the workspace. An implementation of the coupling technique in a 3D information visualization environment is described.

21 Claims, 9 Drawing Sheets

OTHER PUBLICATIONS

Mackinlay, J. Card., S., and Robertson, G, "Rapid Controlled Movement Through a Virtual 3D Workspace," Proceedings of SIGGRAPH '90, Aug. 1990, pp. 171–176.

Perlin, K. and Fox, D., "Pad: An Alternative Approach to the Computer Interface," Computer Graphics Proceedings of SIGGRAPH '93, Anaheim, CA, AUG. 1–6, 1993, pp. 57–64.

Robertson, G., "The Document Lens," Proceedings of UIST '93, Nov., 1993., pp. 101–108.

Fisher, S.S., et al., "Virtual Environment Display System", ACM Workshop on Interactive 3D Graphics, Chapel Hill, North Carolina, Oct. 1986, pp. 1–11.

Herot, C.F. "Spatial Management of Data", ACM Trans. on Database Systems, vol. 5, No. 4 (Dec. 1980), pp. 493–514.

COUPLING A DISPLAY OBJECT TO A VIEWPOINT IN A NAVIGABLE WORKSPACE

This application is related to co-pending U.S. application Ser. No. 08/227,762.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

The present invention relates to an interactive user interface method of coupling a display object to a viewpoint in an n-dimensional workspace of a processor-controlled system, wherein the display object remains coupled to the viewpoint while the user navigates in the workspace.

Processor-based systems such as personal computers and workstation systems that are used to assist a single user or multiple users in retrieving, storing, manipulating and understanding large amounts of information require innovative user interfaces that result in lowering the transaction costs of finding and accessing information. Display based, graphical user interfaces (GUIs) have been used to provide the perception to the system user of having a workspace in which to manipulate information. One type of graphical user interface (GUI) employs a two-dimensional (2D) desktop metaphor where information is presented in a single 2D display region that is bounded by the physical size of the display area of the display device and that serves as a metaphorical desktop. The desktop workspace may include other 2D display regions, called windows, which may be considered workspaces themselves. The system user interacts with —that is, performs operations on —displayed 2D graphical objects included in the desktop or window workspace, including icons, menus, dialog boxes and application objects such as text and graphics, using a pointing device. The graphical desktop workspace is typically constrained by the physical size of the particular display area, and the entire workspace is perceptible to the user at one time. An open application window, however, typically only shows a portion of its workspace at one time, thus providing the user with the sense that the workspace is larger than that immediately displayed within the boundary of the window. The system user navigates in a window workspace by scrolling from one portion of the workspace to another; display objects in the workspace are perceptible if included in the current view of the workspace displayed in the window, and are no longer perceptible when the user changes the view of the workspace by scrolling to a different part of the workspace.

An example of a large, navigable 2½D workspace is disclosed in Perlin, K. and Fox, D., "Pad: An Alternative Approach to the Computer Interface," *Computer Graphics Proceedings of SIGGRAPH '93*, Anaheim, Calif., Aug. 1–6, 1993, pp. 57–64. Pad is an infinite 2D information plane that is shared among users and populated by Pad Objects with which a user can interact. Pad Objects are organized geographically; every object occupies a well defined region on the Pad surface. Pad objects make themselves visible through two mechanisms: a graphic and a portal, which is a view into the single, infinite shared desktop, analogous to a magnification glass that can peer into and roam over different parts of the Pad surface, and thus portals are used for navigation in the workspace using a navigation technique called semantic zooming. In this type of workspace, display objects have the attribute of scale and are perceptible if included in the current view of the workspace at the current scale, and may no longer be perceptible when the user changes the view of the workspace by changing the scale of the view (i.e., by zooming) into the workspace.

Robertson, Card and Mackinlay in "Information Visualization Using 3D Interactive Animation", *Communications ACM*, 36,4, April 1993. pp. 57–71 (hereafter, "the Robertson article") disclose a system known as the Information Visualizer that is composed of multiple, 3D navigable workspaces each containing graphical objects, called Interactive Objects, representing visualizations of information. System users can have arbitrary positions and orientations in each workspace, and techniques are provided for rapid, controlled and targeted 3D movement by the user in the workspace, such as the technique disclosed in U.S. Pat. No. 5,276,785 to Mackinlay et al., entitled "Moving Viewpoint with Respect to a Target in a Three Dimensional Workspace." Mackinlay, J., Card., S., and Robertson, G. "Rapid Controlled Movement Through a Virtual 3D Workspace," *Proceedings of SIGGRAPH '90*, August, 1990, pp. 171–176 (hereafter, the Mackinlay article), discloses the concept and basic operation of point-of-interest object movement within a single workspace of the Information Visualizer. The movement technique, based on 2D mouse input, integrates point-of-interest viewpoint movement, uses the mouse cursor to control a ray that determines the lateral position of the object, and uses keyboard keys to control the position of the object on the ray. In this type of workspace as well, display objects are perceptible if included in the current view of the workspace, and may no longer be perceptible when the user changes the view into the workspace.

It can be seen that these representative implementations of single or multiple workspace, 2D, 2½D or 3D visualization environments with multiple viewpoints provide powerful mechanisms for graphically visualizing and operating on large amounts of information. However, these navigable environments create the problem for the system user of needing to maintain accurate knowledge about the location, and perhaps orientation or scale, of display objects in the workspace so that the user can easily and quickly accomplish desired operations on or with display objects, such as, for example, editing or input operations where the tool the user is using has a fixed location in the workspace, but the display object to be operated on is not nearby. The user must then expend time and effort to move in the workspace between the tool and the display object to be operated on. Similarly, when a display object in one part of the workspace contains information that is useful to the user in another part of the workspace, again the system user must expend time and effort to move in the workspace between the information display object and other display objects that are to be referenced.

SUMMARY OF THE INVENTION

The present invention recognizes the navigation and efficiency problems that arise with respect to moving between different portions of a multiple viewpoint, navigable workspace because a task to be accomplished is in one portion of the workspace environment while a particular display object for the task is located in another portion of the workspace. The present invention solves these problems by coupling the position, and, depending on the type of workspace, the orientation or scale as well, of a selected display object to the user's viewpoint into the workspace at a particular point in time, and then maintains the same relationship between the display object and that viewpoint as the user uses standard navigation techniques in the workspace for moving to various locations therein. The selected display object thus remains perceptible to the system user during motion as it was perceptible at the time it was selected, and the system user will always be able to view and access the coupled display object. For example, the invention prevents the selected display object from disappearing from the user's view when the user selects another viewpoint into the workspace that would not otherwise include a view of the selected display object in its original position. In addition, several display objects coupled in this manner will remain in the same fixed relationship to each other as well as to the user as they were when they were first selected, and they will appear to the user in that fixed relationship when the user navigates in the workspace.

The present invention for coupling a display object to a viewpoint may be used in any navigable, multiple viewpoint 2D, 2½D, or 3D workspace. Conceptually, coupling a display object to a viewpoint into the workspace is analogous to enabling the user to carry the object with him or her as the user moves in the workspace, and the term "coupling" as used herein in intended to include any combination of programming and data structure modification techniques that provide this observable result.

Another aspect of the present invention provides that a display object selected for coupling may be presented to the system user in a preferred viewing position and orientation in the workspace and then coupled to the viewpoint in that preferred viewing position and orientation. A display object selected for coupling, for example, may be in an original, or current, position and orientation in the workspace that makes it difficult to work with if it is a tool display object with which the user will be interacting. The present invention provides for presenting an image of the workspace to the user showing a selected display object in a position and orientation in the workspace that is likely to make the display object easy to use or work with, and the display object in that preferred viewing position and orientation is then coupled to the viewpoint for subsequent use and motion in the workspace.

Still another aspect of the invention provides for the same features of coupling to apply to a display object representing an operation or function that is included in the workspace but that is not a permanently visible object in the workspace. This type of display object includes, for example, an editing tool that is displayed for use when selected by the user using a menu, dialog box, keyboard combination or any other suitable interactive method. In response to the user's selection and in accordance with the present invention, a display object representing a selected operation or function is displayed in a preferred viewing position and orientation and is coupled to the present viewpoint into the workspace prior to the user's interaction with it.

The present invention can be implemented on a processor-controlled system that includes a user input device for producing signals indicating actions of a system user; a display; a processor connected for receiving signals and for presenting images on the display; and memory for storing data. A first image of a navigable workspace presented on the display is perceptible as viewed from a first viewpoint in the navigable workspace. The navigable workspace includes a first display object. A signal from the system user is received indicating the system user's selection of the first display object as a selected display object. In response to the first signal, the selected display object is coupled to the first viewpoint. Then, a sequence of next viewpoint signals is received from the system user requesting viewpoint motion in the navigable workspace. Each next viewpoint signal indicates a next viewpoint in the navigable workspace that is displaced in the workspace from a preceding next viewpoint in the sequence of signals. In response to each next viewpoint signal, a respective next image is presented that includes the selected display object perceptible in the next image as a moved continuation of the selected display object in a preceding respective next image. Each respective next image is perceptible as viewed from the next viewpoint in the navigable workspace. While the selected display object is coupled to the first viewpoint, the selected display object is presented in each respective next image so that the selected display object is perceptible as viewed from the first viewpoint in the navigable workspace.

The present invention is premised on the discovery that a display object coupled to a viewpoint in the workspace can be made to remain in a first perceptible relationship to the user when the viewpoint into the navigable workspace changes by actually adjusting the position in the workspace (and also the orientation or scale, depending on the number of dimensions in the workspace) of the selected display object as successive viewpoint changes are requested. In the context of a 3D workspace, coupling a selected display object to the first viewpoint is accomplished in one embodiment by storing viewpoint coordinate and viewpoint orientation data for the first viewpoint when a next viewpoint into the workspace is selected or requested. The selected display object is presented in a second image as perceptible as viewed from the first viewpoint by changing the selected display object's position and orientation data in the workspace by the difference between the saved viewpoint coordinate data and the next viewpoint coordinate data, and by the difference between the saved viewpoint orientation data and the next viewpoint orientation data.

The present invention also provides for returning the display object to its original position and orientation in the workspace when object coupling is completed. In this case, the data structure representing the selected display object is modified appropriately to show changes in position and orientation in the workspace while the object is coupled, and maintains the original position and orientation so that the object can be repositioned in its original position and orientation when coupling is completed.

When an end-of-coupling signal is received indicating that coupling of the selected display object has been completed, the selected display object is decoupled from the first viewpoint. Decoupling is accomplished by no longer reflecting changes of viewpoint by changing the display object's position and orientation data. In addition, a third image may be presented in the display area including the selected display object perceptible in its original position and orentation in the workspace The processor-controlled system of the present invention may include input circuitry connected to a user input device for receiving signals indicating actions of a system user; output circuitry connected to a display device having a display area for presenting images; a processor connected for receiving the signals from the input circuitry, and connected for providing images to the output circuitry for presentation by the display device; and instruction data stored in memory indicating instructions the processor can access and execute. The processor presents a first image on the display that is perceptible as viewed from a first viewpoint in a first navigable n-dimensional workspace that includes a first display object. The processor then carries out the steps of the invention as described above.

The invention can also be implemented as an article of manufacture for use in a system that includes a storage medium access device such as a floppy disk drive or a CD drive. The article can include a data storage medium such as a floppy disk or a CD-ROM and data stored by the medium. The stored data indicates user signal input instructions and processor response instructions which carry out the steps of the invention as described above.

The novel features that are considered characteristic of the present invention are particularly and specifically set forth in the appended claims. The invention itself, however, both as to its organization and method of operation, together with its advantages, will best be understood from the following description of the illustrated embodiment when read in connection with the accompanying drawings. In the Figures, the same numbers have been used to denote the same component objects and acts.

Figure 1:
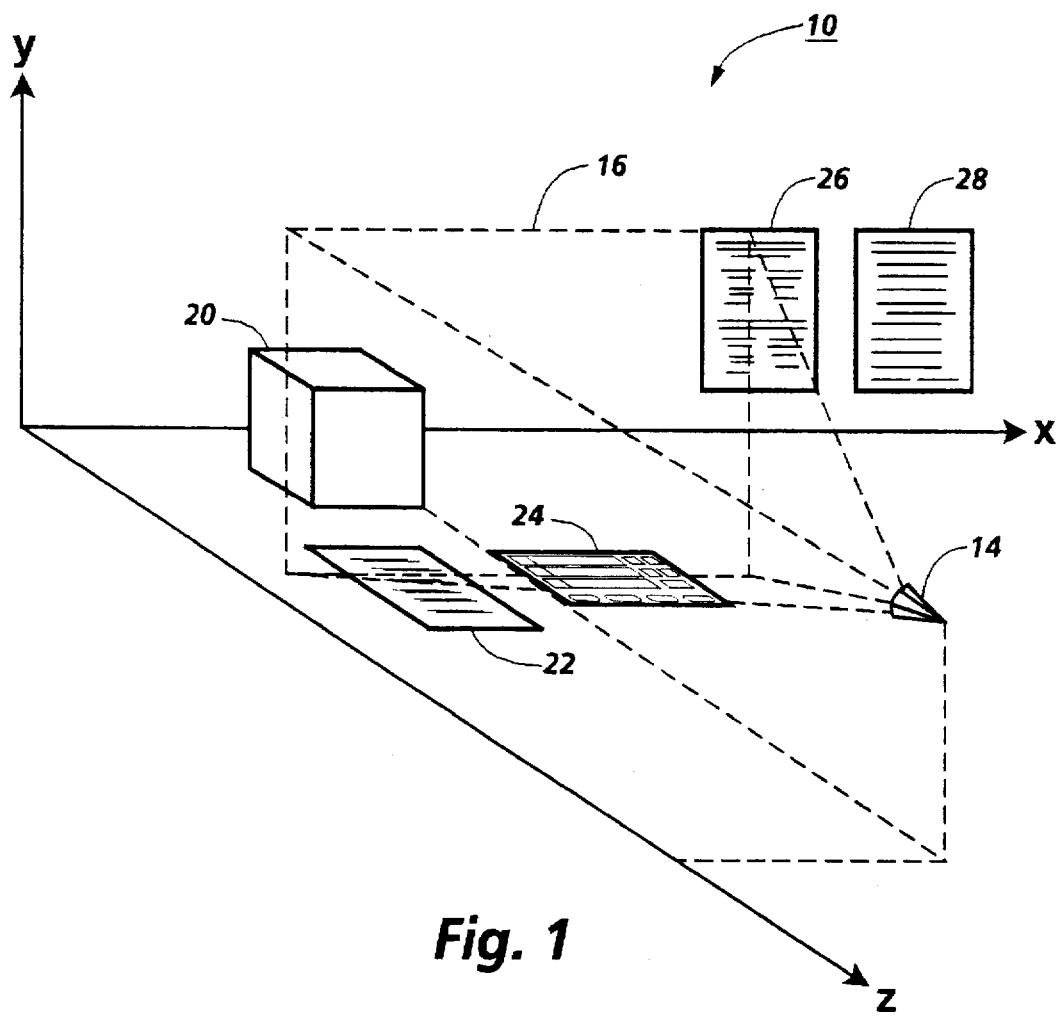
FIG. 1 is a schematic view of display objects and a viewpoint in a navigable workspace.

While the present invention will be hereinafter described in connection with an illustrated embodiment, it will be understood that it is not intended to limit the invention to that embodiment. On the contrary, it is intended to cover all alternatives, modifications and equivalents as may be included within the scope of the invention as defined by the appended claims.

DETAILED DESCRIPTION

The present invention is related to an invention described in the copending, commonly assigned patent application by the same inventor, Ser. No. 08/227,762, entitled "Transporting a Display Object Coupled to a Viewpoint Within or Between Navigable Workspaces", which is hereby incorporated by reference herein.

A. Conceptual Framework

The present invention relates to operating a machine or system including a processor, and to processing electrical or other physical signals to produce other desired physical signals. The detailed descriptions which follow are presented largely in terms of display images and symbolic representations of operations of data within the memory of the system. These descriptions and representations, which are algorithmic in nature, are the techniques used by those skilled in the data processing arts to most effectively convey the substance of their work to others skilled in the art. An algorithm is here, and generally, conceived to be a self consistent sequence of acts leading to a desired result. These acts are those requiring physical manipulations of physical quantities such as electrical or magnetic signals that are capable of being stored, transferred, combined, compared, and otherwise manipulated. It proves convenient at times, principally for reasons of common usage, to refer to these signals by a variety of terms, including bits, values, elements, pixels, symbols, characters, terms, numbers, items, or the like. However, all of these terms and the additional terms defined below are convenient labels applied to appropriate physical quantities.

Further, the manipulations performed are often referred to in terms, such as adding, comparing, or determining, which are commonly associated with mental operations performed by a human user. Apart from supplying certain signals to the machine or system operated by the invention, the capability of a human user is neither necessary nor desirable in the operations described herein which form part of the present invention.

In addition, the algorithmic descriptions of the invention that are presented herein for operating the system are not inherently related to any particular processor, machine, or other apparatus. The machine or system may be specially constructed for the required purposes or it may comprise a general purpose computer selectively activated or reconfigured by a computer program stored in the computer. Useful machines for performing the operations of the present invention include general purpose digital computers or other similar devices configured as described below and in the claims.

The following terms provide the framework for describing the embodiment of the claimed invention illustrated in the accompanying drawings. These terms have the meanings indicated below throughout this specification and in the claims, rather than any meanings that may occur in other sources, such as, for example, the documents incorporated by reference herein elsewhere in this description.

The term "data" or "data item" refers herein to physical signals that indicate or include information. Data items can be combined into a "data structure" such that the data structure "includes" the combined data items; thus, a "data structure" is any combination of interrelated data. A data structure may also include other data structures. An item of data "indicates" a thing, an event, or a characteristic when the item has a value that depends on the existence or occurrence of the thing, event, or characteristic or on a measure of the thing, event, or characteristic. When an item of data can indicate one of a number of possible alternatives, the item of data has one of a number of "values". For example, viewpoint coordinate data indicates information about the viewpoint into a three dimensional workspace when the viewpoint coordinate data includes a value for the x, y and z coordinates of the position of the viewpoint and a value for the x, y and z coordinates of the orientation of the viewpoint in the workspace. A first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. For example, when a first item of data indicates position information of an image display feature in the display area of a display device, and the position information may be used by the processor to obtain a second data item in a data structure, the first item of data indicates the second item of data.

A "processor-controlled system" or "processor" is any machine, component or system that can process data, and may include one or more central processing units or other processing components. Any two components of a machine or system are "connected" when there is a combination of circuitry that can transfer data from one of the components to the other. An "instruction" is an item of data that a processor can use to determine its own operation. A processor "uses" data in performing an operation when the result of the operation depends on the value of the data. A processor executes a set of instructions when it uses the instructions to determine its operation, and an "operation" results from the processor executing the set of instructions. Thus, a set of instructions may be considered to be an operation.

"Memory" is any component, combination of components, circuitry, or system that can store data, and may include local and remote memory and input/output devices. An example of memory is a storage medium access device with a data storage medium that it can access. A "data storage medium" or "storage medium" is a physical medium that can store data. Examples of data storage media include magnetic media such as floppy disks and PCMCIA memory cards, optical media such as CD-ROMs, and semiconductor media such as semiconductor ROMs and RAMs. As used herein, "storage medium" covers one or more distinct units of a medium that together store a body of data. For example, a set of floppy disks storing a single body of data would be a storage medium. A "storage medium access device" is a device with circuitry that can access data on a data storage medium. Examples include floppy disk drives and CD-ROM readers.

An "image" is a pattern of light. A "display" or "display device" is a device that provides output defining an image that includes information in human perceptible form. A display may, for example, include a cathode ray tube; an array of light emitting, reflecting, or absorbing elements; a device or structure that presents marks on paper or another medium; or any other device or structure capable of defining an image in a visible form. A "display area" is the portion of the display in which an image is presented or the medium which receives an image. Data "defines" an image when the data includes sufficient information for the processor to directly produce the image, such as by presenting the image on a display. Data defining an image may be referred to as "image definition data". The processor "presents" an image on a display when an operation executed by the processor produces image definition data defining the image and provides the image definition data defining the image to output circuitry connected to the display for display in the display area so that the image is perceptible to a system user.

The term "display feature" refers to any human perception produced by the display in the system. A "display object" is a visually distinguishable display feature that is perceptible as a coherent unity. A display object "includes" a display feature if presentation of the display object can produce perception of the display feature. A display object that has a distinguishable outline and a bounded area may be called a "region". An image "includes" a display feature or display object if presentation of the image can produce perception of the feature or display object. For example, display object 20 in FIG. 7 "includes" a front surface 21 when the system user can perceive front surface 21 from the display features presented, such as, for example, from the arrangement and orientation of the black lines that make up display object 20.

In a processor-controlled machine or system, there is a mapping between items of data within the system and display features included in images presented by the system. A display feature "represents" a body of data when the display feature can be mapped to one or more items of data in the body of data, or, stated in another way, a display feature "represents" the item or items of data to which it can be mapped. For example, display object 22 in FIG. 3 selected in image 44 for coupling may represent one or more object data structures that indicate both display information about the display object, such as, for example, its coordinates in the workspace, its graphical or character shape, its color and the like, and content information, such as the character data that is visible on the surface of the display object.

A "workspace" is a display feature within which other display features or display objects in an image are perceived as having respective spatial positions relative to each other, as for example, in a space. A workspace can be a display feature with a visible boundary on the display, such as a window, but a workspace need not have a visible outer boundary, nor does the entire workspace need to be displayed at one time in order to produce the perception of a workspace. The presentation of a workspace, or a portion thereof, produces the human perception of display features in respective relative positions. A workspace is perceived as being viewed from a viewing position, and this position is called the "viewpoint." In a three-dimensional workspace, described in more detail below, the viewpoint may be one of many positions within the workspace. In a two-dimensional (2D) workspace, the viewpoint is a viewing position into the workspace that is typically orthogonal to the workspace. A 2D workspace may have more than one viewpoint into the workspace from which it may be viewed. An example of such a 2D workspace is a 2D window that provides for changing the contents displayed in the window, as, for example, by scrolling the window's contents. This scrolling effectively results in changing the viewpoint in the minus-y direction in a 2D plane defined by an x-y coordinate axis.

A "three-dimensional workspace" is a workspace that is perceived as extending in three orthogonal dimensions. Typically, a display has a 2D display surface and the perception of a third dimension is produced by visual clues such as perspective lines extending toward a vanishing point; obscuring of distant objects by near objects; size changes in objects moving toward or away from the viewer; perspective shaping of objects; different shading of objects at different distances from the viewer, and so forth. Three-dimensional (3D) workspaces include not only workspaces in which all of these cues combine to produce the perception of three dimensions, but also workspaces in which a single cue can produce the perception of three dimensions. For example, a workspace overlapping display objects or a workspace within which a view can zoom in on a display object can be a 3D workspace even though display objects within it are presented in orthographic projection, without perspective. This latter example of a workspace is often referred to as a "2½D" workspace.

Data indicating the viewpoint into a 3D workspace includes x, y, and z coordinate data indicating the viewpoint's position. Data indicating the viewpoint into a 3D workspace may also include data indicating the viewpoint's "direction of orientation" into the workspace. The direction of orientation is the direction from the viewpoint into the field of view along the axis at the center of the field of view. Each viewpoint into a 3D workspace provides a view into the workspace that is delineated by a truncated pyramid structure called a viewing frustrum. An example of a viewing frustrum is shown in FIG. 1. A viewing frustrum is specified by specifying two items: the position of the user's eye and the position of a point in the workspace to be centered in the view. A viewing transform automatically produces an axis defined by these two items which is called the "line of sight." The "line of sight" is a ray cast from the user's eye through the center of the viewing frustrum and produces an axis orthogonal to the image surface of the display.

A viewpoint into a workspace may be controlled by a system user using a user input device that provides signals for controlling the viewpoint, such as, for example, one or more key combinations on a keyboard, or the pressing of buttons on a mouse, or by a body-mounted device that senses actual physical movement, such as a head-mounted device that senses head movement. A viewpoint into a workspace is distinguishable from a cursor position in the workspace with which a user may directly manipulate objects in the workspace.

"Viewpoint motion" occurs when a sequence of images is presented that are perceptible as a series of views of an n-dimensional workspace from each of a series of moving or displaced viewpoints. This perception may result from perception of display features or display objects in the workspace as "continuations" or "moved continuations." A second display feature is perceptible as a "continuation" of a first display feature when presentation of the second display feature follows presentation of the first display feature in such a way that the user perceives the first display feature as being continued when the second display feature is presented. This can occur when the successive display of two display features is so close in time and space that they appear to be the same display feature. An example of this is the phenomenon called "object constancy." A second display feature is perceptible as a "moved continuation" of a first display feature if it is perceptible as a continuation in a different position. The first display feature is perceived as "moving" or as having "movement" or "motion" or as being "displaced."

A "navigable workspace" is a workspace in which a user can determine the part of the workspace that is presented on the display by requesting changes in the viewpoint. Presentation of part of a navigable workspace in response to a user input signal requesting viewpoint motion, can produce the perception of controlling movement within a workspace. Signals from a user input device requesting a change of viewpoint into the workspace are synonymous with a user action requesting viewpoint motion.

Figure 13:
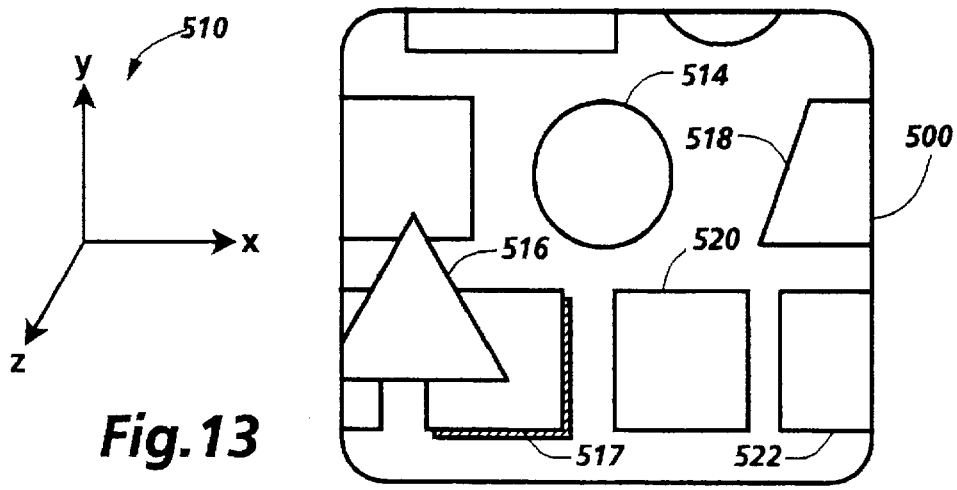
FIGS. 13–15 are a sequence of schematic views of presented images that illustrate viewpoint motion in a 2½D workspace, and illustrate coupling a selected display object to a first viewpoint, according to the steps shown in FIG. 11.
Figure 14:
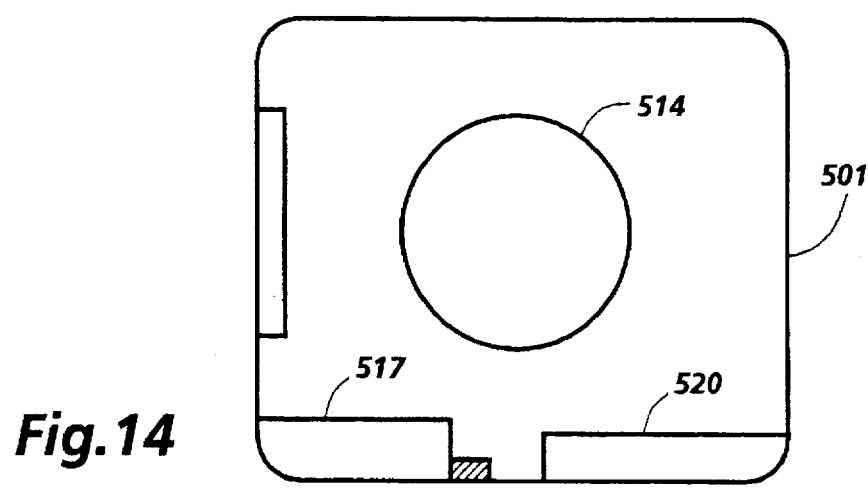
Figure 15:
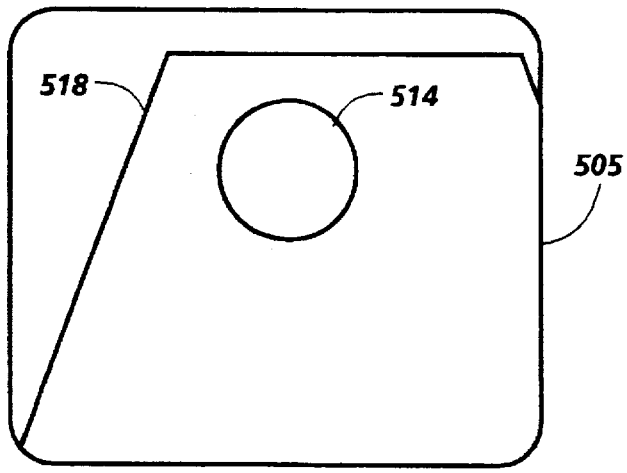

The location of a display object included in a workspace is described by its position in the workspace, which is called its "absolute position." In a 2D workspace, the object's absolute position is expressed by its x, y coordinates in the workspace. In a 3D workspace, a display object's absolute position is expressed by its x, y, z coordinate position. In a 3D workspace, the location of a display object is also described by its absolute orientation in the workspace. For example, display objects 20 and 22 in FIG. 1 each have an orientation in 3D workspace 10 that is expressed by the x, y, z coordinates of the object's rotation, scaling, and translation in the workspace. In FIGS. 13-15, the absolute orientation of display object 514 in the workspace is expressed by the object's scale.

A display object included in a workspace may also have the characteristic of being "location sensitive," and "user selectable", meaning that the entire display object, or a display feature within the display object, may be selected by user signals indicating the location of that display feature, or of the display object, in the workspace. In general, an action by a user "indicates" a thing, an event, or a characteristic when the action demonstrates or points out the thing, event or characteristic in a manner that is distinguishable from actions that do not indicate the thing, event, or characteristic. A signal from a user input device indicates selection of a location sensitive display object, or indicates a position in an image, if the signal includes data from which the display object or position can be uniquely identified. For example, if a signal includes data indicating a mouse pointer displacement, a system can find a point in the display plane based on the previous pointer position. This point can then be used to project a ray from the viewpoint into the 3D workspace being presented, and the coordinates of display objects in the workspace can be used to find the nearest display object intersected by the ray.

In an object-based, or object-oriented, system, a set of instructions constituting an operation may be represented by a location sensitive, selectable display object in an image. A user signal may include a request to initiate or invoke an operation and information identifying the requested operation, wherein the signal or signals indicate one or more actions by a system user intended to cause performance of the operation. An operation is performed by the system "in response" to one or more user signals when the signals received are for indicating a valid request for a valid operation and for causing the operation to be performed. Signals indicating a single complete request or action may include a combination of any number of signals indicating a valid request for a valid operation and for causing the operation to be performed.

B. General Features

Figure 3:
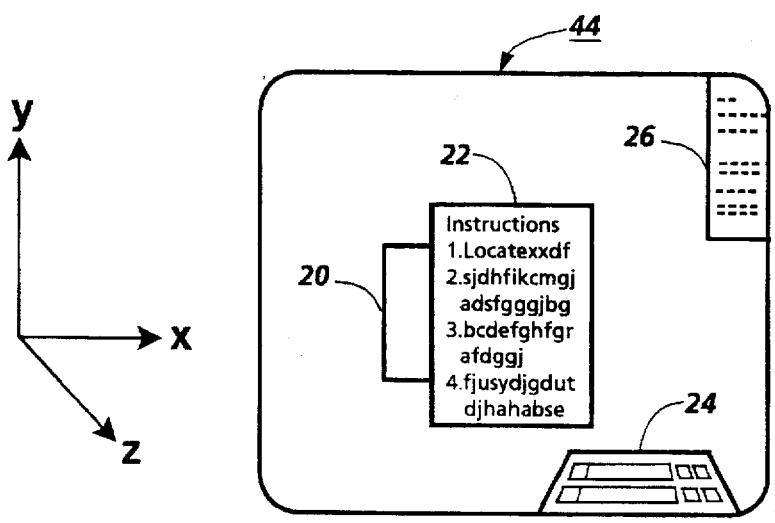
FIG. 3 is a schematic view of a presented image that includes a selected display object from FIG. 1 in a preferred viewing position according to the present invention.
Figure 4:
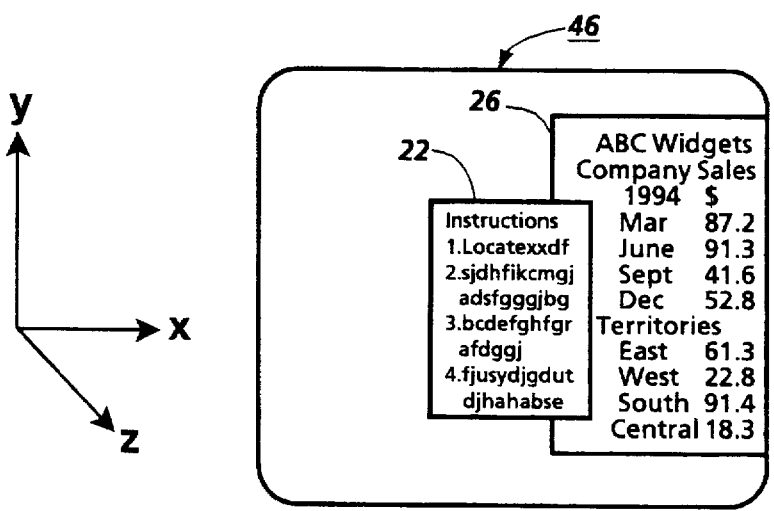
FIG. 4 is a schematic view of a presented image that illustrates the results of viewpoint motion in the workspace of FIG. 1, and illustrates the coupling of a selected display object to a first viewpoint, according to the steps shown in FIG. 8.
Figure 5:
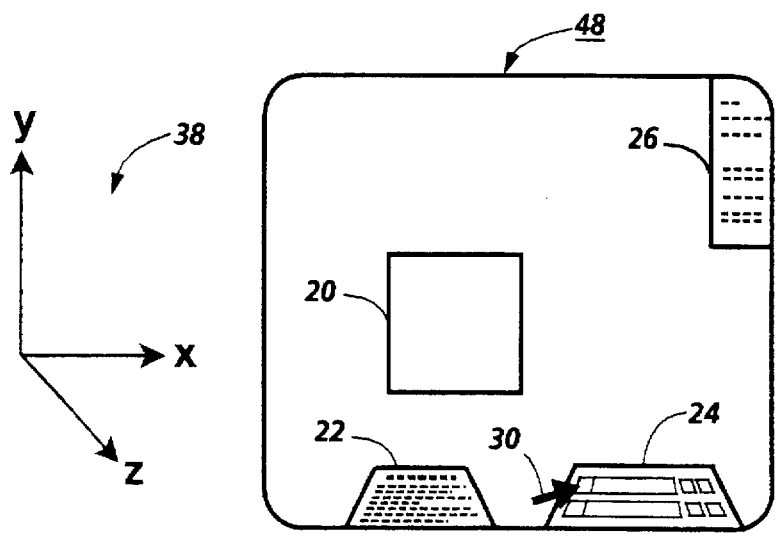
FIG. 5 is a schematic view of a presented image that includes an interactive display object shown in FIG. 1 from a first viewpoint.
Figure 6:
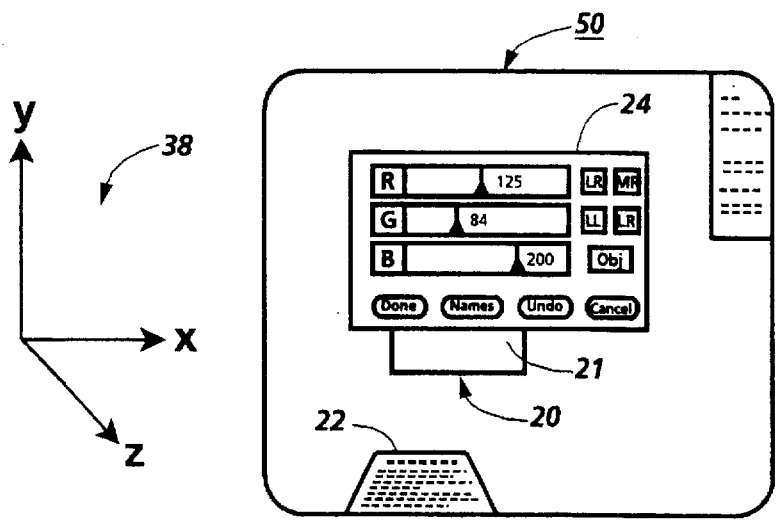
FIG. 6 is a schematic view of a presented image that includes the selected interactive display object from FIG. 5 in a preferred viewing position according to the present invention.
Figure 7:
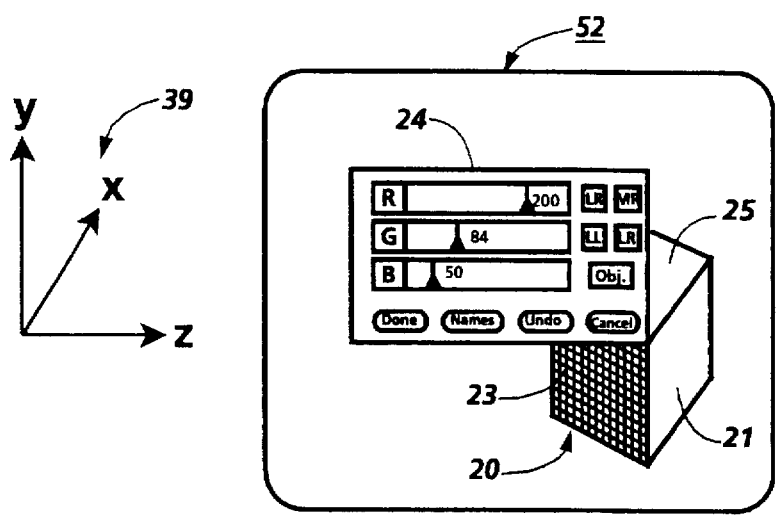
FIG. 7 is a schematic view of a presented image that illustrates the results of viewpoint motion in the workspace of FIG. 1, and illustrates the coupling of the selected interactive display object to a first viewpoint, according to the steps shown in FIG. 8.
Figure 8:
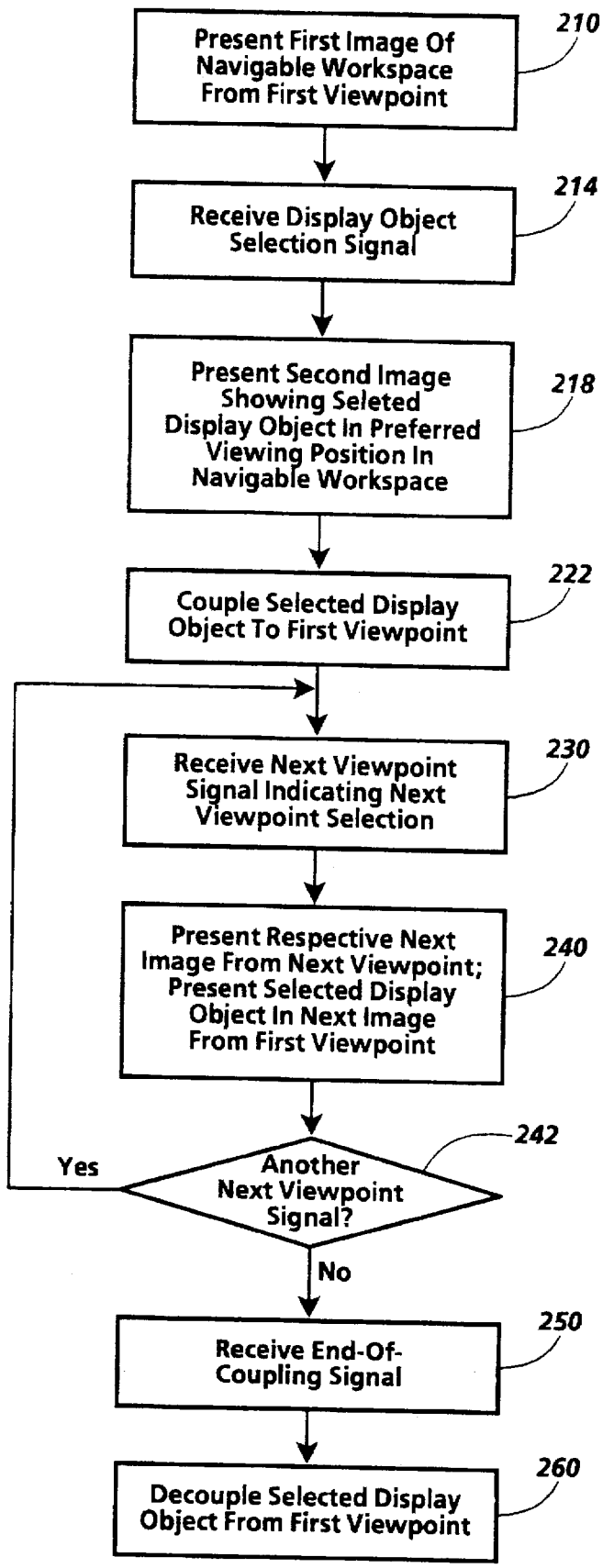
FIG. 8 is a flow chart illustrating the steps of the present invention for coupling a display object to a viewpoint during viewpoint motion in a workspace.

FIGS. 1-8 illustrate the general features of the present invention. FIGS. 1-4 illustrate the general concept of multiple viewpoints into a navigable workspace and a sequence of presented images resulting from coupling a display object in a navigable workspace and then moving in the workspace according to the present invention. FIGS. 5–7 illustrate a second sequence of presented images resulting from the user selecting an interactive display object for coupling. FIG. 8 illustrates the general steps of the present invention.

1. Viewpoints into a Navigable Workspace.

Figure 2:
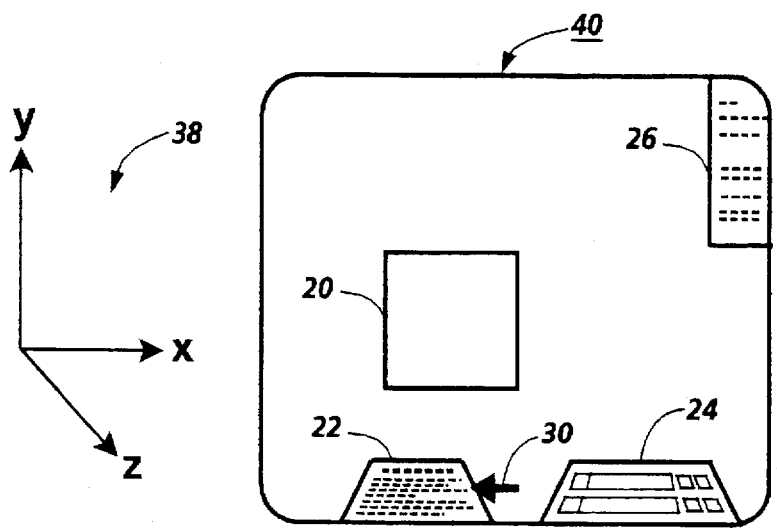
FIG. 2 is a schematic view of a presented image that includes some of the display objects shown in FIG. 1 from a first viewpoint.

FIG. 1 illustrates navigable workspace 10, which happens to be a three-dimensional workspace, with the orthogonal axes oriented as shown. Workspace 10 contains display objects 20, 22, 24, 26 and 28. Display objects 22 and 24 are each location sensitive, are selectable by the system user, and each have a coordinate position and orientation in workspace 10 which is called the object's absolute, or original, position and orientation. Display objects 22 and 24 appear to be two-dimensional objects each having indicia on a top surface and each being in a horizontal x -z plane in workspace 10. Display object 26 also appears to be a two-dimensional object having indicia on its top or front surface and is in a horizontal x-y plane in workspace 10. Display object 20 is a three-dimensional object that appears to be resting on the same horizontal x-y plane in workspace 10 as display objects 22 and 24. FIG. 1 also illustrates viewpoint 14 into navigable workspace 10. Viewpoint 14 provides a view into workspace 10 that is illustrated by viewing frustrum 16. In a processor-controlled system that presents images of workspace 10 to a system user, the user viewing workspace 10 from viewpoint 14 will see image 40 in FIG. 2; thus, image 40 is perceptible to the system user as viewed from viewpoint 14 in workspace 10. Coordinate axis 38 in FIG. 2 shows the orientation of the coordinate axis of workspace 10 from viewpoint 14.

Figure 1A:
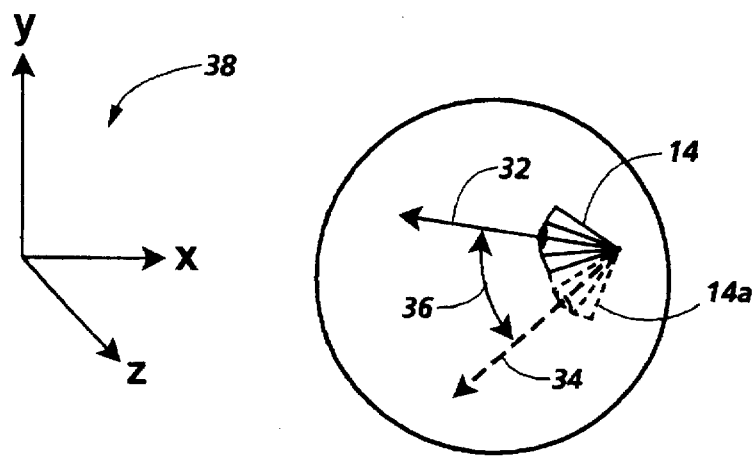
FIG. 1A illustrates viewpoint orientation in a navigable workspace.

Viewpoint 14 includes a viewpoint position that is an x,y,z coordinate position in workspace 10. Viewpoint 14 also includes a direction of orientation, illustrated in FIG. 1A, that is the direction from the viewpoint into the field of view along the axis at the center of the field of view. In FIGS. 1 and 1A, the direction of orientation 32 of viewpoint 14 is normal to the plane of viewing frustrum 16 in workspace 10. As FIG. 1A illustrates, however, the direction of orientation of a viewpoint could vary in the y direction: dotted line viewpoint 14a has a direction of orientation 34 at an angle 36 downward (in the y direction) from direction of orientation 32.

2. Coupling Display Objects to a Viewpoint and Moving in the Workspace.

A general overview of the steps of the present invention is illustrated in FIG. 8, and reference will be made to FIG. 8 during the discussion of the sequence of images in FIGS. 2–4 that illustrate coupling a display object to a viewpoint and moving in the workspace. FIG. 2 illustrates a first image 40 presented according to box 210 in FIG. 8. As noted above, the system user perceives image 40 as viewed from first viewpoint 14; image 40 includes display object 22, and shows cursor 30. Display object 22 is perceptible as being in a horizontal x-z plane in workspace 10. There appears to be indicia on a surface of display object 22, but the indicia are not easy to view from viewpoint 14, with display object 22 in its current position and orientation in workspace 10. Next, step 214 receives a first signal from the system user indicating a selection of display object 22. The system user makes a selection of a display object in any conventional manner, such as by using a pointing device to manipulate cursor 30 over display object 22 and activating a button on the pointing device to send a signal to the system's processor.

In response to selecting display object 22, the step in box 222 couples selected display object 22 to first viewpoint 14. The selected display object will be presented in subsequent images of workspace 10 perceptible as though it were still in its original position and orientation while coupled and during subsequent motion in the workspace. However, in the case of selected display object 22, this would mean that display object 22 would be perceptible to the user as being in the horizontal x-z plane, and its usefulness in this position and orientation may be limited. Thus, in one implementation of the present invention, step 218 is included which presents selected display object 22 in a second image of workspace 10, shown as image 44 in FIG. 3, in a preferred viewing position in workspace 10, so that, for example, the front surface of display object 22 is centered in image 44 and is of a size sufficient to permit the indicia to be clearly viewed. In addition, selected display object 22 is preferably presented in image 44 with no portion of the object obscured by any other display object. This is accomplished by rendering selected display object 22 last in image 44, such that any objects in workspace 10 and image 44 that might otherwise be rendered in a sequence that would obscure all or part of selected display object 22 cannot do so. Any viewing position in workspace 10 that provides a suitable view of the selected display object may be used as the preferred viewing position.

The steps in boxes 230, 240 and 242 of FIG. 8 represent the response to the system user's request for viewpoint motion in navigable workspace 10. Box 230 receives a next viewpoint signal indicating the user's selection of a next viewpoint and a next orientation in the workspace. In response to the user's selection of the next viewpoint and orientation, the step in box 240 of FIG. 8 presents a respective next image (not shown) of workspace 10 from the next viewpoint and orientation. Each next image is perceptible by the system user as viewed from the next viewpoint and orientation in workspace 10, and display objects in workspace 10 that are perceptible in the viewing frustrum of the next viewpoint are perceptible as viewed from that next viewpoint. Each next image includes selected display object 22 which is presented in each next image as perceptible by the system user in its preferred viewing position as viewed from first viewpoint and orientation 14.

The sequence of next images produces the perception of motion in the workspace. For example, as next viewpoints are selected in the plus-x direction, each of the successive images of display object 20 in the viewing frustrum of the next viewpoint is perceived as a moved continuation of the previous image of display object 20 until display object 20 is no longer in the viewing frustrum, which in turn produces the perception to the system user of navigating around workspace 10 by moving to the right on the x-axis in workspace 10. In contrast to display object 20, selected display object 22 is perceived in each of the respective next images in the same position in relationship to first viewpoint and orientation 14 as it was at the time display object 22 was selected and coupled, thus producing the perception that selected display object 22 is fixed at a position in workspace 10 relative to the system user's eye during viewpoint motion.

Image 46 in FIG. 4 presents a view into workspace 10 from the last of the sequence of next viewpoint signals received, and illustrates the results of receiving a sequence of next viewpoint signals from the user that displaces each preceding viewpoint a distance forward in the minus-z direction and laterally in the plus-x direction in the coordinate axis system of workspace 10 shown in FIG. 1, in order to approach display object 26 and bring it into view sufficiently to view the indicia on its front surface.

It can be seen from examining FIGS. 1, 2 and 4, that display object 22 would not be perceptible in image 46 presenting workspace 10 from the last viewpoint if it were not coupled to first viewpoint and orientation 14, since, by moving in the minus-z and plus-x directions in the workspace, display object 22 would not be in the viewing frustrum of the last viewpoint. Thus, the technique of the present invention permits the system user to essentially carry display object 22 around the workspace while moving in the workspace. In the illustrated example of FIGS. 2–4, selected display object 22 contains reference information that remains perceptible to the system user while display object 26 is being viewed, and illustrates only one example of the many purposes a system user might have for carrying a display object around a navigable workspace.

The step in box 250 receives an end-of-coupling signal. An end-of-coupling signal may be a signal that the user sends which specifically requests the end of coupling of the selected display object, or it may be a signal sent by the user or by an operation in the system that causes coupling to end as a result of its execution. For example, the user might select a specific end-of-coupling command from a system menu to explicitly cause a decoupling operation to occur, or the user might signal the end of use of selected display object 22, which might cause a decoupling operation to occur along with other operations when a display object's function is terminated. Or, the system user may select an available function the operation of which is implemented so as to decouple any existing coupling of a display object to a viewpoint.

In response to the end-of-coupling signal, the step in box 260 decouples selected display object 22 from implementation viewpoint 14. In one implementation of the present invention, selected display object 22 is returned to its original position in workspace 10, in the horizontal x-z plane shown in FIGS. 1 and 2. As a result of uncoupling, then, the view of workspace 10 shown in image 46 would no longer include selected display object 22, and workspace 10 from viewpoint 14 would again be perceptible as shown in image 40 of FIG. 2, with display object 22 shown in its original position. When display object 22 is uncoupled from a viewpoint, in subsequent views of workspace 10 from other viewpoints, successive images of display object 22 will provide the perception that display object 22 is a moved continuation of the previous image of display object 22, and will no longer be perceived as being in the same position in relationship to, and at the same distance from, a single viewpoint.

Coupling a display object to a viewpoint results in the display object being repositioned in the workspace in response to a change in viewpoint into the workspace. Coupling may be accomplished using a variety of techniques. One technique is described below in the description of an illustrated implementation, and uses one or more display object properties to identify coupled display objects for determining updated display object workspace positions and orientations in response to a change in viewpoint or orientation.

The present invention also supports the selection of multiple objects for coupling, each object being coupled to the same or to a different viewpoint, depending on the viewpoint into the workspace when it was selected for coupling. When multiple objects are selected for coupling at the same time, when viewing a workspace from the same first viewpoint and orientation, the invention preserves the spatial relationship among selected display objects in the workspace. When display objects are selected for coupling at different times, when viewing a workspace from different viewpoints and orientations, the invention preserves the spatial relationship between a newly selected and coupled display object and a previously coupled display object in the workspace. When multiple objects are selected for coupling, one implementation of the invention may adjust the preferred viewing position of an earlier coupled display object in order to determine and accommodate the preferred viewing position of a later coupled display object.

In an implementation variation, a display object selected for coupling may be presented with an added display feature that indicates to the system user that the display object is coupled. For example, the coupled display object might be presented with a changed background color, or be presented with a darker or thicker outline, or have a colored line added to it to conspicuously indicate that the display object is coupled to the viewpoint.

FIGS. 2, 3 and 4 show that the original position in the workspace of a display object selected for coupling is changed first to the preferred viewing position and orientation and then as viewpoint motion occurs. However, in an implementation variation, a copy of the display object could be used during the coupling operation and then deleted during the uncoupling operation. In this implementation, images of workspace 10 presented to the system user would present an image copy of the selected display object, and the original display object would remain in its original position.

3. Coupling an Interactive Display Object to a Viewpoint.

The present invention may also be used to couple an interactive display object to a viewpoint. An interactive display object is one with which the user may interact, such as, for example, to perform an operation on another display object. FIG. 5 shows presented image 48, which is the same view into workspace 10 as that of FIG. 2, from viewpoint 14. Display object 24 is an interactive display object perceptible as being in a horizontal x-z plane in workspace 10. Image 48 also shows cursor 30 over interactive display object 24. With reference again to FIG. 8, box 214 of FIG. 8 receives a signal from the user indicating selection of interactive display object 24.

In response to selecting interactive display object 24, step 218 presents selected display object 24 in a second image of workspace 10, shown as image 50 in FIG. 6, in a preferred viewing position in workspace 10, in a position and orientation that enables the interactive front surface of display object 24 to be of a size sufficient to permit effective interaction. The step in box 222 couples selected display object 24 to first viewpoint 14.

In the illustrated example, interactive display object 24 is a color editing tool that has adjustment regions for adjusting the quantity of red, green and blue color in a color mixture for an object in the workspace that has a color defined. Interactive display object 24 includes other regions that offer additional functionality. In this example, the user has selected the color editing tool in order to color one or more of the surfaces of display object 20. Image 50 in FIG. 6 shows only front surface 21 of display object 20. In order to view another surface and access it for color editing, the user must change the viewpoint into workspace 10.

As described earlier, steps in boxes 230, 240 and 242 of FIG. 8 represent the response to the system user's request for viewpoint motion in navigable workspace 10. The respective next images presented as a result of viewpoint motion in workspace 10 are not shown, but it is to be understood that the sequence of next images produces the perception of motion in the workspace, that each next image is perceptible by the system user as viewed from the next viewpoint and orientation in workspace 10, and that display objects in workspace 10 that are perceptible in the viewing frustrum of the next viewpoint are perceptible as viewed from that next viewpoint. Each next image includes selected interactive display object 24 which is presented in each next image as perceptible by the system user in its preferred viewing position as viewed from first viewpoint and orientation 14 as it was at the time it was selected and coupled, thus producing the perception that selected interactive display object 24 is fixed at a position in workspace 10 relative to the system user's eye during viewpoint motion.

Image 52 in FIG. 7 presents a view into workspace 10 from the last of the sequence of next viewpoint signals received, and illustrates the results of viewpoint motion in the coordinate axis system of workspace 10 of FIG. 1 that comprises a small distance forward in the minus-z direction, laterally in the minus-x direction, and upwardly in the plus-y direction, and with a changed orientation at an angle downward from the normal, in order to approach display object 20 and bring it into view sufficiently to view its side and top surfaces 23 and 25, respectively. During this motion, selected interactive display object 24 is perceptible as being fixed in workspace 10 in its preferred viewing position as viewed from first viewpoint and orientation 14 as it was at the time it was selected and coupled. The user may now interact with the color adjusting regions on the front surface of display object 24 in order to adjust the color of a surface of display object 20. Image 52 shows, via the cross hatching effect, that the color of surface 23 has been changed.

It can be seen from examining FIGS. 1, 6 and 7, that display object 24 would not be perceptible in image 52 presenting workspace 10 from the last viewpoint if it were not coupled to first viewpoint and orientation 14, since the motion in the workspace necessary to view surface 23 of display object 20 would place display object 24 outside of the viewing frustrum of the last viewpoint. In the case of using an interactive tool, without the coupling feature of the present invention, the system user would need to repetitively move in the workspace between the tool and the object to be edited in order to effectively accomplish the editing task, which in the example shown involves changing the colors of the surfaces to the desired colors. The present invention permits the system user to carry the tool to the object.

An important alternative implementation of the present invention permits the user to select an interactive display object for coupling that is available to accomplish an operation in the workspace, but that is not presently perceptible in any image of the workspace. Such display objects may be made available to the user in response to selecting a function on a menu, or in response to entering a combination of keyboard keys that represent and invoke a function, or by any other conventional interaction technique. In place of selecting a perceptible interactive display object, then, the user may select an available function that is represented by an interactive display object using a conventional interaction technique. In response, the step in box 218 makes the selected interactive display object perceptible in an image of the workspace in a preferred viewing position, and the step in box 220 couples the selected interactive object to the current viewpoint. Thus, in the context of the present invention, selecting a display object for coupling includes selecting any available display object in the workspace, regardless of whether it is presently perceptible in an image of the workspace.

In response to the end-of-coupling signal received in box 250, the step in box 260 decouples selected interactive display object 24 from viewpoint 14. If selected display object 24 was perceptible in the workspace at the time of selection, it is returned to its original position in workspace 10, in the horizontal x-z plane, as shown in FIGS. 1 and 5. When display object 24 is uncoupled from a viewpoint, in subsequent views of workspace 10 from other viewpoints, successive images of display object 24 will again provide the perception that display object 24 is a moved continuation of the previous image of display object 24, and it will no longer be perceived as being in the same position in relationship to, and at the same distance from, a single viewpoint. If selected display object 24 was not perceptible in the workspace at the time of selection, it is made imperceptible and it disappears from image 52 in FIG. 7 in response to the end-of-coupling signal received in box 250.

C. An Implementation

An embodiment of the present invention has been implemented as part of a software system known as the "Information Visualizer" on a Silicon Graphics 4D/440 VGX computer running the Irix operating system, available from Silicon Graphics, of Mountain View, Calif. It runs on all current Silicon Graphics platforms which offer the Iris GL graphics library from Silicon Graphics. The software system is written in a standard version of the Franz Allegro Common Lisp programming language in conjunction with the Iris GL graphics library, using a compiler and interpreter available from Franz, Inc. of Berkeley, Calif. It will be apparent to those of skill in the art from the following description of the illustrated implementation that a wide variety of programming languages and hardware configurations could readily be used in place of those in the illustrated embodiment based on the description herein without departing from the scope and intended utility of the present invention.

1. The System.

Figure 9:
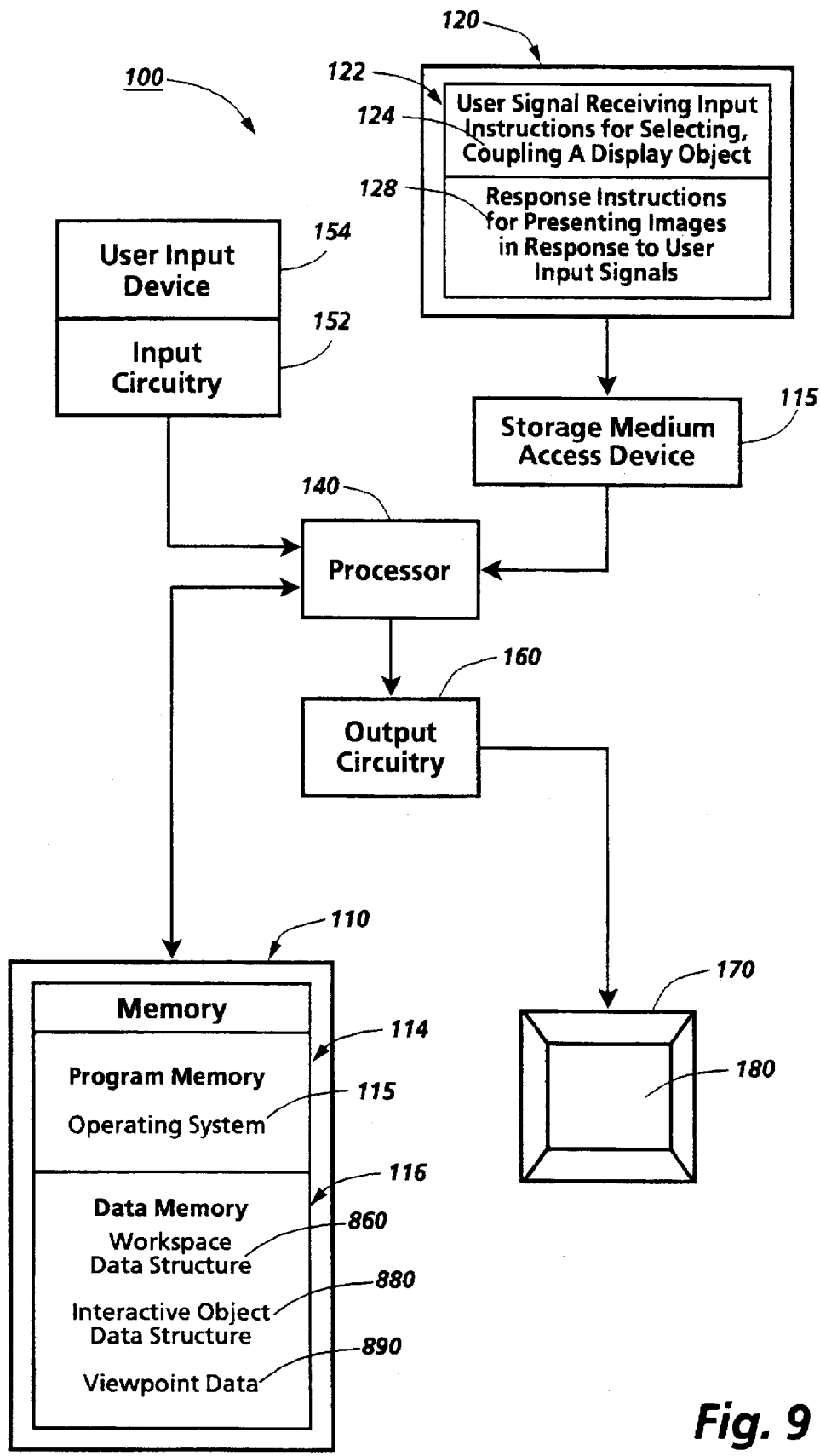
FIG. 9 is a simplified block diagram illustrating the system environment in which the present invention may be used, the system configuration of the system of the present invention, and the software product of the present invention.

FIG. 9 shows components of a processor-controlled system 100 implementing the present invention. System 100 includes input circuitry 152 for receiving user signals from user input device 154 indicating actions or requests by a system user. User input device 154 includes a keyboard and a mouse in the present implementation. User input device 154, however, may include any one of a variety of input devices controllable by a user that produces signals of the type needed by the present invention. Suitable input devices include, but are not limited to pointing devices, such as a stylus, pen, and trackball. The user input device has circuitry (not shown) for controlling the interaction between the system user and display features and objects presented on display device 170. For example, the pointing device may have buttons (not shown) which when clicked or released result in signals being sent through input circuitry 152. In the case of a pen-like or stylus device that can be moved over the display surface of display area 180, there may be a pressure sensitive tip switch (not shown) which results in signals being sent through input circuitry 152 when the user presses the tip switch against display area 180, such as, for example, when the system user uses the stylus to make gestures in display area 180. The method of the present invention may be implemented in a manner to receive signals indicating a display request from any of these user input devices.

Processor 140 is connected for accessing program memory 114 of memory 110 to retrieve instructions, which it then executes. Processor 140 is also connected for accessing data memory 116 in addition to receiving input signals from input circuitry 152, and for providing data defining images, for example, the images shown in FIGS. 2, 3 or 4, to output circuitry 160 for presentation on display device 170 in display area 180. Program memory 114 stores operating system instructions 115, and stores the instruction data indicating the instructions for operating system 100 according to the present invention. Data memory 116 stores workspace data structure 860, interactive object data structures 880, and viewpoint data 890.

2. Overview of Processing Environment.

The Information Visualizer system is a real time 3D graphics animation system providing plural, simulated 3D, navigable workspaces for user interaction. One important application of the system is to provide effective visualizations of a large corpus of information, such as from a large data base, which can be termed a "large information space." Thus, a workspace visualization of a large information space may contain many objects that each may be highly detailed or complex in nature. A system user is permitted to interact with the visualized information objects by navigating in the workspace in order to orient a view into the workspace that provides the most effective access to desired information. An animation loop routine controls the presentation of images to a user during an interactive session. The "animation loop" is a repeated operation in which each repetition presents an image and in which objects and other display features in each image appear to be continuations of objects and display features in a preceding image. If the user is providing signals through a user input means, the signals can be queued as events and each loop can handle some events from the queue. An "animation cycle" is a single iteration of an animation loop. In response to an appropriate call, processor 140 (FIG. 9) executes the animation loop routine, which includes a loop that continues until terminated by an appropriate signal from user input device 154. Each animation cycle of the loop can use double buffer techniques to present a respective image on display 170, with the respective images together forming a sequence such that display features in each image appear to be continuations of display features in the previous image in accordance with object constancy techniques. A brief description of the animation loop is useful in understanding the implementation of the present invention.

Each animation cycle includes a call to input handling subroutines to receive and handle the next item on a FIFO event queue maintained by operating system 115. The event queue includes signals from the user such as keystrokes, mouse events, and mouse pointer movements, and can also include events from other sources such as from another process. Each animation cycle also includes a call to viewpoint motion subroutines to determine the current position and orientation of the viewpoint. Then the animation cycle calls 3D workspace subroutines to redraw the three-dimensional workspace. In redrawing the workspace, the 3D workspace subroutines call object drawing routines to redraw each object in the workspace. Additional information about the software system known as the Information Visualizer may be obtained from the Robertson article, cited earlier, and in Card., S., Robertson, G, and Mackinlay, J., "The Information Visualizer, An Information Workspace,", *Proceedings of SIGCHI '91*, 1991, pp. 181–188 (hereinafter, "the Card article"), which are both hereby incorporated by reference herein, and from additional articles cited therein. Viewpoint motion in a workspace may be accomplished by a variety of techniques, both manual and automated. One technique, called point of interest motion, is described in commonly assigned U.S. Pat. No. 5,276,785 issued to Mackinlay et al. and entitled "Moving Viewpoint with Respect to a Target in a Three Dimensional Workspace," and in the Mackinlay article cited earlier, which are both hereby incorporated by reference herein.

3. Data Structures.

Operation of the present invention involves changes to the data structures that provide a model of each workspace and its contents. Data memory 116 (FIG. 9) includes 3D workspace data structure 860, interactive object data structure 880, and viewpoint data 890, as well as other data stored and accessed during execution of instructions in program memory 114. 3D workspace data structure 860 can include a list of objects in the workspace and data indicating the extent of the workspace. Each display object included in an image that is a view into a workspace represents an object known as an Interactive Object. Workspaces themselves are Interactive Objects, as are individual display features included in workspaces, such as walls and doors. An Interactive Object may itself be composed of other Interactive Objects, or may be an object that is itself included in another Interactive Object. Each Interactive Object is represented by a data structure 880 which includes information about the workspace it is in, other Interactive Objects that it may be composed of, type data indicating its geometric shape or other visual attributes of the object when it is rendered, coordinate data indicating its absolute position and orientation within the workspace, a list of other objects that are attached to the object, if any, and various properties that control behavior of the object, including whether it can be selected for manipulation by the user, and, if so, how it behaves when selected, and whether, or when, the object is visible or not visible from a viewpoint into the workspace. Data memory 116 also includes various data items that store transitional or parameter data needed to perform the various functions of the system.

Certain Interactive Objects in the Information Visualizer system may be objects with which a user may directly interact, such as by manipulating a display feature of the object with a pointing device, or by entering input into a region of the object using a keyboard. This type of selectable interactive object may be visible in the workspace, or may not be visible but may be made visible upon selection by the user via a keyboard or menu command. A selectable interactive display object that is visible in the workspace may have an absolute, or original or home, position in the workspace that places it in a peripheral portion or out of the way location in the workspace in order to provide space for other information display objects. Display object 24 is an example of a selectable interactive display object that is perceptible as being on the "floor" of workspace 10 in images 40, 44 and 48. Each Interactive Object in the Information Visualizer system has a property (the heads-up property) for determining whether the object has a "heads up position" when it is selected. A "heads up position" is an object position and orientation in the workspace, distinguishable from the object's absolute position, in which the Interactive Object is presented when selected by the user. The heads up position is typically one that presents the display object in a convenient viewing position and orientation relative to the current viewpoint and orientation and presents a front or top surface prominently showing the interactive regions of the display object. For example, the heads-up position and orientation of display object 24 might be its current position and a plus ninety degree (90°) rotation about the x-axis to bring display object 24 into an x-y plane from its current x-z plane of orientation. In the illustrated implementation, when an object is selected that has its heads-up property set to ON, presentation of the object in its heads-up position involves animating the motion of the object from its home position to its heads-up position. Similarly, when the object is deselected, return of the object to its home position involves animating the motion of the object from its heads-up position to the home position. The term "heads-up" used in this context, to refer to object properties and positions in a virtual workspace, is distinguishable from the term "head-up" or "heads-up" used in the context of a display environment in a military (e.g., airplane cockpit) context, where a head up display typically means imposing an image in front of a user over an external world.

Table 1 below lists and describes the data items that are specifically utilized in conjunction with the illustrated implementation of the present invention. The term "gaze" is used in Table 1, and hereafter in the description, as a general term for viewpoint position and orientation in the data names "tied-to-gaze" and "direction-of-gaze." The term "heads-up" is used to refer to object properties that relate to interactive objects having a heads up position and orientation in the workspace when selected.

TABLE 1

| Data Item /Property | Description and Use/Values |
| --- | --- |
| tied-to-gaze | object property that tracks whether an object is coupled to a viewpoint; Values: on/off toggle. |
| non-zbuffer | object property that tracks whether object zbuffering should be ignored; used in animation loop rendering routine to render last the objects with this property "ON" so that they are not obscured by other objects in the workspace; Values: on/off toggle. |
| home position | an object property that gives the workspace position and orientation coordinates for an object's absolute position in the workspace; |
| heads-up-position | an object property that gives the workspace position and orientation coordinates for an object that has a heads-up position and orientation when selected that is different from its home position in the workspace; |
| current position | an object property that gives the workspace position and orientation coordinates for an object's current position in the workspace; used during viewpoint motion when the object is coupled to a viewpoint; |
| heads-up-tied-to-gaze | an object property that tracks whether an object that has a heads-up position when selected is to be coupled to a viewpoint; Values: on/off toggle. |
| *N-Objects-Tied-To-Gaze* | a count of the objects that are coupled to a viewpoint; used for efficiency; e.g., to determine whether object positions need to be recomputed after a change of viewpoint; Values: integer. |
| saved viewpoint data; saved "dog" data | a viewpoint comprises two data items: the x,y,z coordinate position of the viewing point into the workspace, also called the "eye"; and the x,y,z coordinate position of the direction of orientation, or direction of gaze (abbreviated as "dog"). |
| non-zbuffer-count | a count of the objects that have the non-zbuffer property ON; used for efficiency during each animation cycle to draw non-zbuffered objects last; Values: integer. |

4. Input Event Handling and Selecting and Coupling a Display Object.

Figure 10:
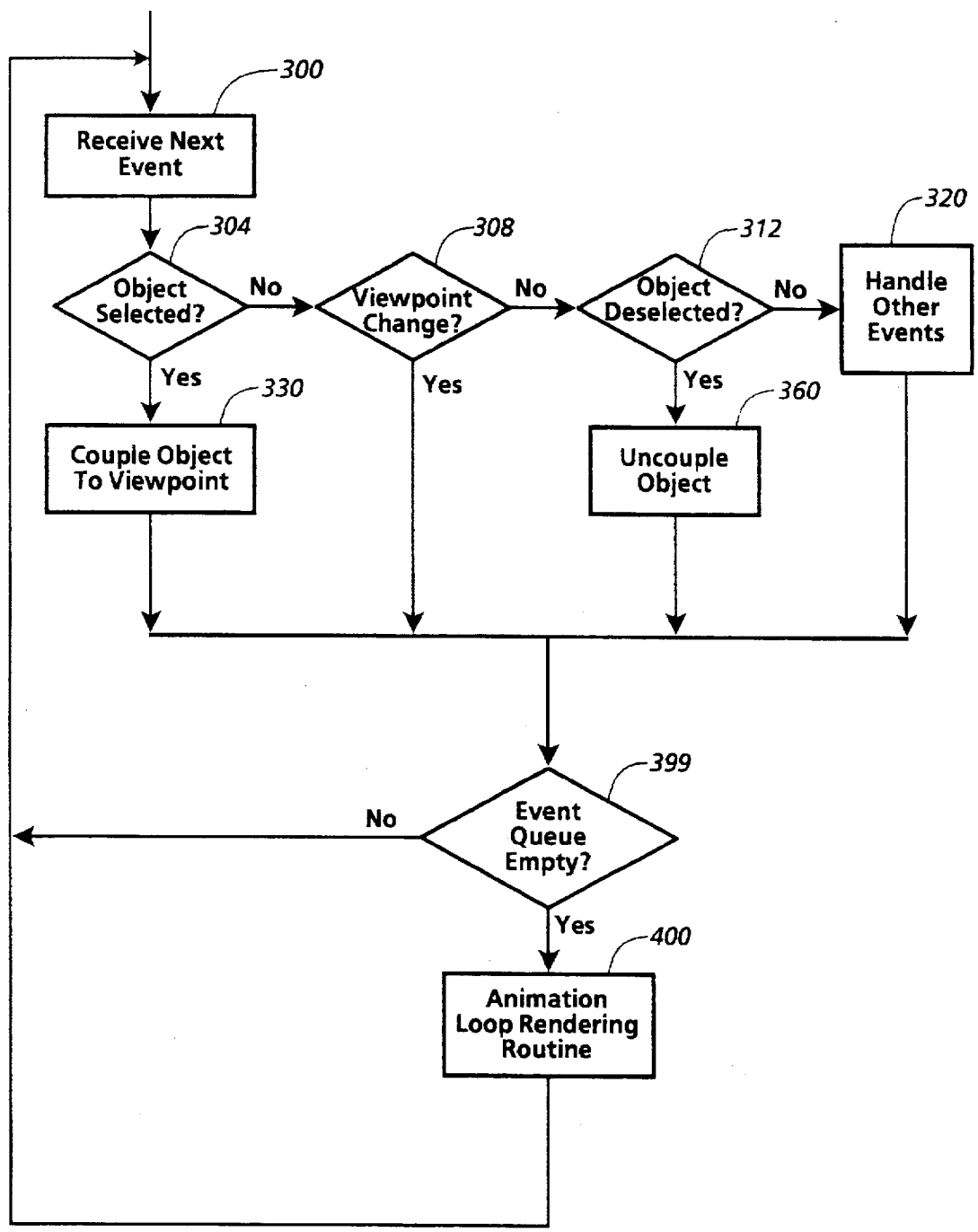
FIG. 10 a flow chart illustrating the animation loop as it relates to input events for coupling a display object to a viewpoint according to an implementation of the present invention.
Figure 11:
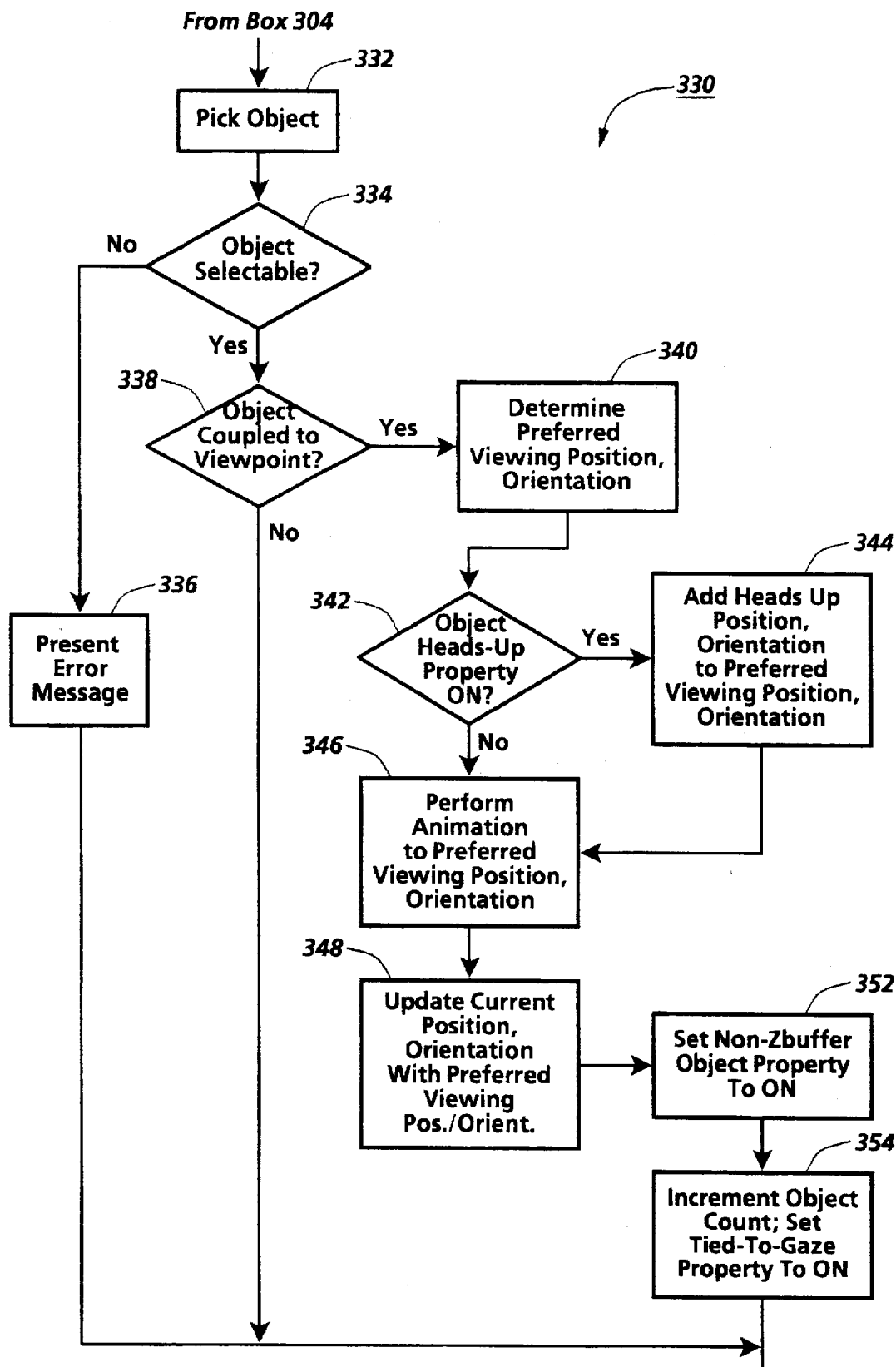
FIG. 11 is a flow chart illustrating a routine for initiating object coupling, according to an implementation of the present invention.
Figure 12:
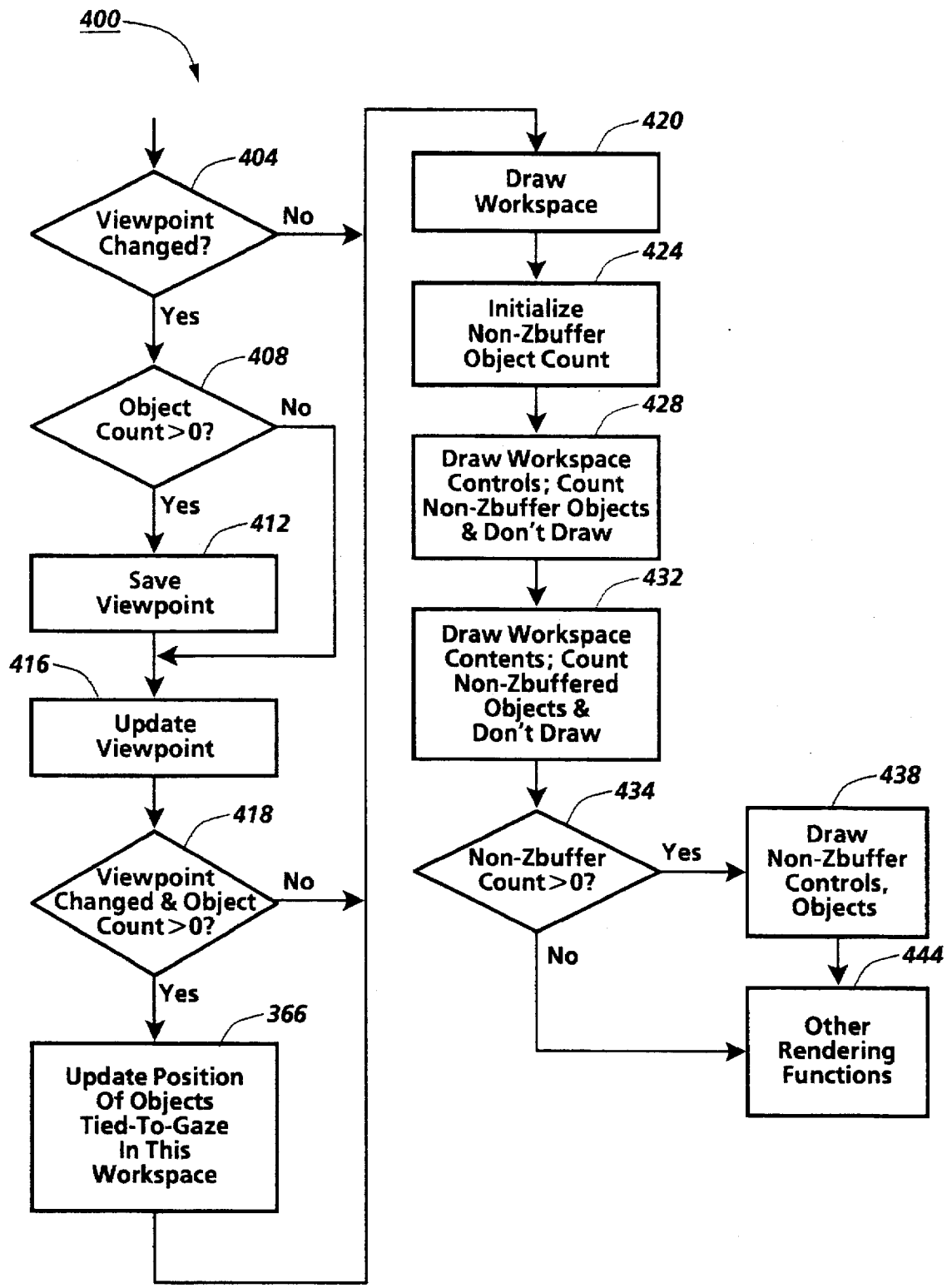
FIG. 12 is a flow chart illustrating the animation loop rendering routine for drawing the workspace, according to an implementation of the present invention.

The steps of the illustrated implementation are shown in the flowcharts of FIGS. 10–12 as they relate to viewpoint motion in the workspace with a coupled display object. The flowchart in FIG. 10 provides an overview of the animation loop as it relates specifically to input events for selecting and deselecting an object that is to be coupled to a viewpoint during viewpoint motion. The flowchart in FIG. 10 indicates that, upon execution of event handling routines, such as coupling an object to a viewpoint (routine 330), and after all events in the event queue have been handled, via the test in box 399, control passes to animation loop rendering routine 400, which draws the 3D workspace. However, it is more precise to describe the animation loop as continuously executing in order to provide the perception of animated movement to the user while the user's cursor is positioned in the workspace. For example, in this implementation, animation loop rendering routine 400 is called approximately 30 times per second. Changes that have occurred to objects and to the viewpoint as a result of events handled between these calls will be presented in the next iteration of animation loop rendering routine 400.

With continued reference to FIG. 10, step 300 receives the next input event from the event queue. Input event processing includes testing for whether an object selection signal has been received, in box 304. If so, control is transferred to step 330, a routine for processing selected objects, illustrated in more detail in FIG. 11. If the input event is not an object selection, input event processing further includes testing for whether a viewpoint change has been received, in box 308. If so, control is transferred to box 399 to test whether the event queue is empty, and then to animation loop rendering routine 400. If the input event is not a viewpoint change, input event processing further includes testing for whether a signal deselecting an object has been received, in box 312. The query in box 312 is phrased in a general manner and is intended to include any event signal that results in a previously selected display object no longer being selected. Such a signal could include an explicit command by the user to decouple an object, or could include a signal indicating the end of an interactive operation, such as when the user has concluded editing colors with display object 24 in FIG. 7 and presses the "Done" or "Cancel" button included in interactive display object 24. Such a signal could also be generated by another process, such as when completion of an operation causes a selected display object to be deselected automatically without user intervention or action. If a signal resulting in deselection of an object is received, control is transferred to step 360, a routine that decouples a selected display object from the viewpoint. If none of these events has been received, the input event is another type of input event and is handled by step 320.

5. Object Selection, Coupling and Decoupling Operations.

When a signal indicating an object selection is received, control is transferred to routine 330 illustrated in FIG. 11. The object selection signal may be the result of moving a cursor to a visible object and using a pointing device to select the object, or object selection may be accomplished by means of a menu selection when the user selects an available menu function. Alternatively, object selection may be accomplished by a combination of keyboard keys. Step 332 executes a "pick-object" routine. Pick object routine 332 may provide a displayed cursor in the image for the user to use to select an object. The pick-object routine determines which object in the workspace the user selects, and returns the selected object. The query in box 334 tests an object property to determine whether the object is available to be selected. The step in box 336 presents an error message if an unavailable display object is selected, and the remainder of object selection processing is bypassed.

If a properly available object has been selected, the step in box 338 queries whether the selected object is to be coupled to the current viewpoint and orientation into the workspace. This test may involve querying one or more object properties to determine if coupling is to be performed. For example, if an object's heads-up property is ON, this query may test whether an object's Heads-Up-Tied-To-Gaze property is ON. If an object's heads-up property is OFF, a different object property may be queried to determine if coupling is to be performed. If object coupling is not to be performed, processing continues to box 399 in the animation loop. In the illustrated implementation, coupling is determined in one of two ways. The first way, illustrated in box 338, involves testing whether a pre-established object property indicates that coupling an object to the viewpoint should be performed whenever the object is selected by the user. A second way involves the function of object transporting within or between workspaces, where an explicit transport command may be invoked by the user which results in coupling a display object selected for transporting to the viewpoint. Object transporting is described in copending, commonly assigned patent application, Ser. No. 08/227,762. In this description, when the phrase "a display object selected for coupling" is used, it is intended to include a display object having an object property which indicates that the display object should be coupled to the viewpoint when selected by the user, as well as display objects explicitly selected for coupling by the user.

For a selected object that is to be coupled to the viewpoint, the step in 340 determines the preferred viewing position and orientation (referred to as "the PVP/O") in the workspace of the coupled display object. The PVP/O is, in effect, a starting position and orientation in the workspace from which subsequent positions and orientations will be determined for a selected object coupled to the viewpoint. Sample source code from the illustrated implementation for determining the PVP/O is included in Appendix A immediately following this description. In the code, the data items "(make-home-point)" and "(make-orientation :y(dog-degrees))" are computed and used as the home position and the home orientation, respectively. The data item "dog", or direction of gaze, represents a point four (4) feet in front of the current eye, looking in the current direction of gaze. The function "make-home-point" does a vector addition to get a position eight (8) feet in from of the eye. The orientation is rotated about the y-axis by the same amount as the current direction of gaze is rotated about the y-axis. This ensures that the object will be perpendicular to the line of sight.

Step 342 then tests whether the selected display object has a heads-up object property that is set to ON, indicating that the object has a heads up position and orientation in the workspace. If so, the heads up position and orientation data item in the object data structure of the selected display object is added by vector addition to the PVP/O. If the object is not a heads-up object, this offset need not be added to the PVP/O for the object.

Since the PVP/O represents a position different than the selected object's home position, in the next iteration of the animation loop rendering routine, the selected object should be presented in the PVP/O. In the illustrated implementation, the transition of the selected object from its home position to its PVP/O is animated, as indicated in step 346. The animation is designed to take approximately one second, and linear interpolation is used to determine the change in position and orientation needed in each animation cycle to move the selected display object from the home position and orientation to the PVP/O for the current cycle time, which, in the illustrated implementation, is 30 frames per second.

At the end of the animated movement, the current position and orientation data item in the object data structure of the selected display object is updated, in box 348, to reflect the PVP/O. Then, the steps in boxes 350 and 354 set the non-zbuffered and tied-to-gaze object properties ON, and increment the "N-Objects-Tied-To-Gaze" count (hereafter, also called the "object count").

With reference again to FIG. 10, when an object deselection operation is received in box 312, control is transferred to routine 360, which updates the object's properties to indicate that a display object is no longer coupled to the viewpoint. In the illustrated implementation, object decoupling occurs as a result of an object being deselected either explicitly by the user or automatically as a result of termination of an operation, and not as a result of an explicit decoupling command invoked by the user. Control is transferred to routine 360, then, each time a single object deselection event is received. Routine 360 sets the non-zbuffer and tied-to-gaze object properties to OFF, and decrements the object count. In the next iteration of rendering routine 400, the setting to OFF of the non-zbuffer property will cause a decoupled display object to be rendered in its original or home position and orientation in the workspace, rather than in its current, coupled position.

6. Viewpoint Motion, Animation Cycle Rendering, and Object Coupling Processing.

The user perceives the effect of selecting a display object for coupling when the user performs viewpoint motion in the workspace. Viewpoint motion is accomplished by the user signaling a sequence of viewpoint position and orientation displacements in the workspace. Rendering routine 400, illustrated in FIG. 12, processes this sequence of viewpoint displacements. The process of producing the visual effect of coupling is discussed first, followed by the details of animation loop rendering routine 400.

a. Object Coupling Processing.

An object coupled to the viewpoint is presented in an image as being in the relationship to the viewpoint and orientation that it was in at the time it was selected for coupling. This feature may be implemented in a number of ways. In the implementation described herein, each change from a prior viewpoint and orientation to a new viewpoint and orientation results in updating the position and orientation in the workspace of each coupled object by applying the difference in position and orientation between the prior viewpoint and orientation and the new viewpoint and orientation to each object's respective position and orientation. This object position and orientation updating function is represented in step 366 in FIG. 12, and sample source code from the illustrated implementation for this position updating operation is included in Appendix B immediately following this description.

Viewpoint and orientation changes may occur in any of the three dimensions. Typically, a user will change the viewpoint by rotation about the y-axis, that is, look to the left or right in the workspace. In such a case, the x and z positions and y-axis orientation of the object in the workspace would be adjusted to reflect the change in order to maintain the coupling of the coupled display object to the viewpoint. Or the user may change position in the z-axis and/or x-axis, that is, move forward or backward in the workspace. In this case, the x and z positions of the object in the workspace would be adjusted to reflect the change in order to maintain object coupling to the viewpoint. A user might also move the viewpoint along the y-axis, that is, move up or down. In this case, the y position of the object in the workspace would be adjusted to reflect the change in order to maintain object coupling to the viewpoint. A less frequent and possibly more disorienting type of movement is rotation about the x-axis, that is, looking up or down in the workspace. Such a change would require adjustments to the y and z positions and x-axis orientation of the coupled display object. In the code of the illustrated implementation in Appendix B, a new coupled display object position and orientation in the workspace is calculated for each viewpoint change rotating about the y-axis, and translating along the x-axis, y-axis, and/or z-axis, but changes in viewpoint involving rotations about the x-axis are treated as special cases and generalized as rotations about the y-axis only. Thus, in the very rare case that the change in viewpoint is exclusively a change in direction of gaze in the workspace rotated about the x-axis only, the code in Appendix B would result in making inadequate position adjustments to the coupled object's position and orientation in the workspace. This is an implementation decision, and such adjustments for x-axis rotation viewpoint changes to a coupled display object's position and orientation could be made in another implementation. It is also conceivable that a user might want to rotate the viewpoint around the z-axis (which would appear like tilting the head to the left or right). In that case, coupled objects would have their x and y positions and z-axis orientation adjusted. The code in Appendix B does not handle rotation of the viewpoint around the z-axis. This is also an implementation decision, and such adjustments for z-axis rotation viewpoint changes to a coupled display object's position and orientation could be made in another implementation.

It can be seen that basing the coupling technique on updating display object positions easily supports coupling multiple display objects where each display object is selected either from the same viewpoint or from a different viewpoint into the workspace, since the technique adjusts the position and orientation of coupled display objects based on applying to each display object the incremental differences in position and orientation between a prior viewpoint and a new viewpoint, and does not depend on storing and performing computations on each actual viewpoint at the time of selection and during viewpoint motion.

b. Animation Cycle Rendering.

Rendering routine 400 checks several parameters indicating the type of movement being performed, and then calls routines for drawing the workspace, the workspace controls and the contents of the workspace. The flowchart in FIG. 12 illustrates the general functions and flow of control of rendering routine 400. Step 404 tests whether the viewpoint into the workspace has changed. If it hasn't, the view of objects in the workspace has not changed, no object translation, rotation, or scaling is needed, and no position updating is needed for coupled display objects; control is transferred to the drawing routines, beginning with step 420. If the viewpoint has changed, step 408 tests whether there are any objects in the workspace having the object property tied-to-gaze ON. If there is, step 412 saves the current viewpoint (the viewpoint from which the workspace is currently being viewed, prior to receipt of the new viewpoint), and then step 416 updates the viewpoint with the new viewpoint information. If there are no objects having the object property tied-to-gaze ON, prior viewpoint information is not needed, and control transfers to step 416 for updating the viewpoint with the new viewpoint information.

With continued reference to FIG. 12, step 418 tests both of these factors together; when both the viewpoint has changed and the object count of objects tied-to-gaze is greater than zero, step 366, the object position updating function, updates the position and orientation in the workspace of all coupled display objects by applying the difference in position and orientation between the prior viewpoint and orientation and the new viewpoint and orientation to the position and orientation of each coupled display object. As noted earlier, source code showing an implementation of step 366 is included in Appendix B.

The actual drawing routines make up the remainder of the functions in rendering routine 400. The step in box 420 draws the workspace. With respect to objects in the workspace, if any objects are coupled to the viewpoint, then they are preferably to appear as though they are in front of, and not overlapped or obscured by, other objects in the workspace. The remaining steps in rendering routine 400 accomplish this by testing for and counting the objects having object property non-zbuffered set to ON, and then drawing those objects last. Step 424 initializes the count of the non-zbuffered objects in the workspace. Step 428 accesses object data structures for a class of objects known as workspace controls, counts the workspace control objects having the non-zbuffered property set to ON, doesn't draw those, and draws the workspace control objects having the non-zbuffered property set to OFF using the position and orientation data indicated by the workspace control current position data item. Similarly, with the remaining classes of objects in the workspace, step 432 access the object data structures, counts the objects having the non-zbuffered property set to ON, doesn't draw those, and draws the objects having the non-zbuffered property set to OFF using the current position and orientation data item.

Step 434 tests whether the non-zbuffered object count is greater than zero, and if so, control is transferred to step 438 where all objects having the non-zbuffered property set to ON are drawn in the workspace. The drawing routine uses the position and orientation data in the current position data item of the object data structure, which contains the updated position and orientation of the coupled display object. Remaining rendering functions are handled in box 444.

D. The System Configuration and Software Product of the Present Invention

The system configuration of the present invention is shown in FIG. 9. Processor 140 may be operated according to the general steps shown in FIG. 8, and specifically according to the illustrated implementation shown in FIGS. 10–12, creating, storing and manipulating the data structures in data memory 116. The actual manner in which the physical hardware components of system 100 are connected may vary, and may include hardwired physical connections between some or all of the components, connections over wired or wireless communications facilities, such as through remote or local communications networks and infrared and radio connections. For example, output circuitry 160, input circuitry 152 and display 170 may be physically embodied in one device 150, such as in flat tablet display having an attached stylus as user input device 154. Memory 110 may include memory that is physically connected to processor 140 as local memory, or that is remotely accessible to processor 140 by means of a wired or wireless communications facility. Thus, when processor 140 accesses a particular data item, that data item may be stored in a memory device that is remotely located from system 100 but which is accessible to processor 140 by means of the appropriate connections. It is further of importance to note that the range of the physical size of system 100 may include a small desktop, laptop, or pocket-sized or smaller device to larger more conventionally sized systems such as those including personal computers or workstations, or even to large electronic whiteboard applications. It is intended that a system carrying out the present invention include all systems in this physical size range.

FIG. 9 also shows software product 120, an article of manufacture that can be used in a system that includes components like those shown in FIG. 9. Software product 120 includes data storage medium 122 that can be accessed by storage medium access device 115. Data storage medium 122 could, for example, be a magnetic medium such as a set of one or more floppy disks, an optical medium such as a set of one or more CD-ROMs, or any other appropriate medium for storing data. Data storage medium 122 stores data 124 and 128 that storage medium access device 115 can provide to processor 140. Stored data 124 and 128 include data indicating user signal receiving input instructions 124, which can be executed to perform steps 214 and 230 in FIG. 8, or step 300 in FIG. 10, for receiving user signals relating to coupling a selected display object to the viewpoint. The stored data also include data indicating response instructions 128, which can be executed to perform steps 218, 240 and 260 in FIG. 8, or routines 330 and 360 in FIG. 10, for presenting images and manipulating data structures in response to the user signals for coupling or uncoupling a selected display object to the viewpoint. In addition, stored data in data storage medium 122 may include data indicating viewpoint motion instructions (not shown) for responding to user signals requesting viewpoint motion.

E. Additional Aspects of the Present Invention

1. Implementation in a 2½D Workspace.

While the object coupling technique of the present invention has been described in terms of an implementation in a 3D workspace environment, the technique may also be implemented in any 2D or 2½D environment having more than a single, fixed viewpoint into a workspace. For example, the coupling technique may be implemented in a 2D navigable workspace that occupies a navigable (scrollable) window.

FIG. 13 illustrates image 500 of a view into a 2½D workspace from a first viewpoint in the plus-z direction, oriented as shown by axes 510. The workspace shown in FIG. 13 appears to extend in the plus-y and in both plus- and minus-x directions, as shown for example, by only partially visible objects 516, 518, and 522. Triangular object 516 appears to be in front of object 517, which is shown as having a drop shadow.

FIG. 14 illustrates image 501 into the same workspace from a second viewpoint, which has moved along the z-axis in the minus-z direction (toward the origin) from the first viewpoint. The user has zoomed in on object 514, and from this second viewpoint, very few of the objects in the workspace are perceptible. The three attributes of display object orientation (rotation, scaling and translation) in a 3D workspace are replaced by the attribute of scale in a 2½D workspace, which controls the perceived appearance of the object's size, proportion or relationship with reference to other objects in the workspace and to the workspace as a whole. The changing scale of display object 514 provides the perception of motion along the z-axis in the workspace.

Returning to FIG. 13 and image 500, object properties of circular display object 514 indicate that display object 514 should be coupled to the viewpoint when selected and during subsequent viewpoint motion in the workspace according to the present invention. Assume for this illustration that the preferred viewing position and scale of display object 514 is its present viewing position and scale in image 500.

FIG. 15 illustrates image 505 of the same workspace from a third viewpoint, which has moved along the plus-x axis from the viewpoint of image 500 to the right in the workspace to bring object 518 into full view, and along the z-axis in the minus-z direction (toward the origin) in order to zoom in on object 518. In accordance with the present invention, selected display object 514 appears to have remained in the same position and at the same scale in the workspace as it was when it was selected in image 500 from the first viewpoint. When object 514 is deselected, it will be returned to its original home position in the workspace, and will no longer be coupled to the viewpoint. Subsequent viewpoint motion from the first viewpoint of image 500 along the plus-z direction when object 514 is not coupled to the viewpoint will again result in the scale of display object 514 changing as shown in FIG. 14 in order to maintain the proper relationship to the other objects in the workspace.

2. Processing Efficiency Considerations.

a. Viewpoint Angle of Rotation About the y-axis.

The 3D implementation has been described with reference to two viewpoint data items relating to viewpoint position and viewpoint orientation. For example, saved viewpoint data includes prior viewpoint position data and prior viewpoint orientation data. A third aspect of the concept of viewpoint in a 3D workspace is the angle of rotation about the y-axis of the direction of orientation that is exemplified by the user looking to the left or to the right in the workspace. The angle of rotation about the y-axis of the direction of orientation can be computed from viewpoint position data and viewpoint orientation data, so it can either be computed once and stored as a third data item representing a complete description of the viewpoint into the workspace, or it can be computed as needed during processing. In the illustrated implementation, the angle of rotation about the y-axis of the direction of orientation is computed and stored as a data item called "dog-degrees," and saved during a viewpoint change as "saved-dog-degrees." The procedure exemplified by the code included in Appendix B for updating the position and orientation of a selected display object in the workspace in response to a change in viewpoint utilizes this third data element of a workspace viewpoint to improve processing efficiency during the updating procedure.

b. Non-Visible Display Objects.

As noted earlier, the coupling technique of the present invention may be applied to display objects that are not visible in any image of the workspace but that are made visible in response to the user's menu or keyboard selection of a function or operation. In the illustrated embodiment, the interactive object data structure that represents this type of display object is created in response to the selection of the function or operation, and then is deleted when the user signals completion of the operation. In an alternative implementation, the interactive object data structure for this display object may be permanently part of the workspace data structure, and its perceptibility in an image of the workspace may be controlled by an object property.

F. Conclusions

In summary, the present invention provides an effective method for carrying display objects around within an n-dimensional, navigable workspace such that a display object always remains within the view of the system user during viewpoint motion. This feature increases user productivity during editing operations by eliminating wasted motion in the workspace, and reduces the chances of the user becoming disoriented while navigating in the workspace in order to move back and forth between a tool and an object being operated on. The invention is easy to use and is consistent with other features that support the perception of a large navigable workspace.

It is therefore evident that there has been provided in accordance with the present invention, a method and system that fully satisfy the aims and advantages hereinbefore set forth. While this invention has been described in conjunction with a specific embodiment thereof, it is evident that many alternatives, modifications and variations will be apparent to those skilled in the art. Accordingly, the invention as herein described is intended to embrace all such alternatives, modifications and variations as fall within the scope of the appended claims.

APPENDIX A

Common Lisp source code for determining the preferred viewing position and orientation in the workspace of an object selected for coupling.

```
;;; Copyright (c) 1989-94 by Xerox Corporations. All rights reserved.
;; = = = from Properties.cl = = =
(defun Edit-Properties (&optional (object nil) slot-name)
    (when (null object)
        (setq object (Pick-Object *Edit-Cursor*)))
    (let ((editor(find-Interactive-Object "Property Editor"))
                (width 50.0) (height 20.0))
        (declare (single-float width height))
        (when (null editor)
            (setq editor
                (Make-3D-Property-Editor
                    "Property Editor"
                    :non-zbuffer t
                    :home (make-home-point)
                    :size (make-3d-size-inline :width width :height height)
                    :tied-to-gaze t
                    :home-orientation (make-orientation :y (dog-degrees)))))
        (Set-Property-Editor-Object editor object slot-name)
        t))
;; = = = from FL-Defs.cl = = =
(defun make-home-point ()
    (let ((eye-x (point-x eye))
                (eye-y (point-y eye))
                (eye-z (point-z eye))
                (dog-x (point-x dog))
                (dog-y (point-y dog))
                (dog-z (point-z dog)))
        (make-3d-point-inline :x (f + (f + eye-x dog-x) dog-x)
                              :y (f + (f + eye-y dog-y) dog-y)
                              :z (f + (f + eye-z dog-z) dog-z))))
```

APPENDIX B

Common Lisp source code for updating the workspace position and orientation of display objects coupled to the viewpoint; called during each animation cycle rendering routine.

```
;;; Copyright (c) 1989-94 by Xerox Corporations. All rights reserved.
;; Called during animation cycle and room switch
(defun Update-Object-Tied-To-Gaze (obj)
    (let* ((position (io-position obj))
           (orientation (io-orientation obj))
           (delta-angle (i - (dog-degrees) saved-dog-degrees))
           (delta-x 0.0)
           (delta-z 0.0)
           (eye-x (point-x eye))
           (eye-y (point-y eye))
           (eye-z (point-z eye))
           (saved-eye-x (point-x saved-eye))
           (saved-eye-y (point-y saved-eye))
           (saved-eye-z (point-z saved-eye))
           (dog-y (point-y dog))
           (saved-dog-y (point-y saved-dog)))
        (declare (fixnum delta-angle)
                 (single-float delta-x delta-z
                    eye-x eye-y eye-z
                    saved-eye-x saved-eye-y saved-eye-z
                    dog-y saved-dog-y))
        ;; Adjust the rotation about Y to match change in gaze orientation
        (setf (orientation-y orientation)
            (i + (orientation-y orientation) delta-angle))
        ;; If gaze is rotated, adjust x and z for rotation
        (when (/ = delta-angle 0)
            (let* ((rx (f - (point-x position) saved-eye-x))  ;; relative x
                   (rz (f - (point-z position) saved-eye-z))  ;; relative z
```

APPENDIX B-continued

Common Lisp source code for updating the workspace position and orientation of display objects coupled to the viewpoint; called during each animation cycle rendering routine.

```
                (old-angle (my-atan (f - 0.0 (point-z saved-dog))
                    (point-x saved-dog)))
                (new-angle (my-atan (f - 0.0 (point-z dog))
                    (point-x dog)))
                (cos (my-cos (f - new-angle old-angle)))
                (sin (my-sin (f - new-angle old-angle)))
                (newrx 0.0) (newrz 0.0))
            (declare (single-float cos sin
                    old-angle new-angle
                    newrx newrz
                    rx rz newx newz))
            (setq newrx (f + (f* rx cos) (f* rz sin)))
            (setq newrz (f - (f* rz cos) (f* rx sin)))
            (setq delta-x (f - newrx rx)
                  delta-z (f - newrz rz))))
    ;; Compute new position
    (setf (point-x position)
        (f + (point-x position)
            delta-x  ;; rotation
            (f - eye-x saved-eye-x)))  ;; translation
    (setf (point-y position)
        (f + (point-y position)
            (f - dog-y saved-dog-y)  ;; rotation (special in y)
            (f - eye-y saved-eye-y)))  ;; translation
    (setf (point-z position)
        (f + (point-z position)
            delta-z  ;; rotation
            (f - eye-z saved-eye-z))))  ;; translation
t)
```

What is claimed:

1. A method of operating a system including a display, a user input device for producing signals indicating actions of a system user, memory for storing data, and a processor connected for receiving signals and for presenting images on the display; the method comprising:

presenting a first image on the display that is perceptible as viewed from a first viewpoint in a navigable workspace; the first workspace including a first display object;

receiving a first signal from the user input device indicating selection by the system user of the first display object as a selected display object;

coupling the selected display object to the first viewpoint in the navigable workspace in response to the first signal;

receiving a sequence of next viewpoint signals from the user input device requesting viewpoint motion in the navigable workspace; each next viewpoint signal indicating a next viewpoint in the navigable workspace that is displaced in the workspace from the next viewpoint of a preceding next viewpoint signal in the sequence of signals; and presenting on the display, in response to each next viewpoint signal, a respective next image including the selected display object; the respective next image being perceptible as viewed from the next viewpoint in the navigable workspace; the selected display object being perceptible as a moved continuation of the selected display object in a preceding respective next image; when the selected display object is coupled to the first viewpoint, the selected display object being presented in each respective next image so that the selected display object is perceptible as viewed from the first viewpoint in the navigable workspace.

2. The method of claim 1 further including, in response to the first signal from the system user indicating the selected display object, determining a preferred viewing position for the selected display object in the navigable workspace; and presenting on the display a second image of the navigable workspace including the selected display object in the preferred viewing position therein; the second image and the selected display object being perceptible as viewed from the first viewpoint in the navigable workspace.

3. The method of claim 2 wherein the preferred viewing position of the selected display object in the navigable workspace is determined using a predetermined distance from the first viewpoint along an axis orthogonal to an image surface of the display.

4. The method of claim 1 wherein the step of presenting each next respective image includes (a) storing viewpoint coordinate data indicating the first viewpoint;

(b) determining an updated display object position in the navigable workspace for the selected display object using the stored viewpoint coordinate data and the next viewpoint;

(c) presenting the selected display object in the next respective image in the updated display object position in the navigable workspace;

(d) after receiving the next viewpoint signal indicating the next viewpoint, modifying the viewpoint coordinate data to indicate the next viewpoint of the preceding next viewpoint signal; and (e) repeating steps (b), (c) and (d) while the selected display object is coupled to the first viewpoint and until all signals in the sequence of next viewpoint signals requesting viewpoint motion have been received.

5. The method of claim 4 wherein the selected display object is positioned in an original position in the navigable workspace; the selected display object being included in the first image; and the method further includes, after presenting the respective next images on the display in response to the next viewpoint signals, receiving a second signal indicating completion of selected display object coupling; and in response to the second signal, uncoupling the selected display object from the first viewpoint in the navigable workspace; and modifying the updated display object position for the selected display object to indicate the original position thereof in the navigable workspace.

6. The method of claim 1 wherein the navigable workspace is a three dimensional (3D) navigable workspace, and wherein the first viewpoint includes a first viewpoint position in the 3D workspace and a first viewpoint orientation of the first viewpoint in the 3D workspace.

7. The method of claim 6 wherein each next viewpoint signal indicates a next viewpoint position and a next viewpoint orientation of the next viewpoint in the 3D navigable workspace; each next viewpoint position and each next viewpoint orientation being displaced in the workspace from the next viewpoint position and the next viewpoint orientation of the preceding next viewpoint signal in the sequence of signals.

8. The method of claim 1 wherein the navigable workspace is a 3D navigable workspace, and wherein the first viewpoint includes a first viewpoint position in the 3D workspace and a first viewpoint scale of the first viewpoint in the 3D workspace.

9. The method of claim 1 wherein the navigable workspace is a two dimensional (2D) navigable workspace, and wherein the first viewpoint includes a first viewpoint position in the 2D workspace.

10. The method of claim 1 wherein the selected display object is an operation display object representing an operation the system user may select for execution.

11. The method of claim 10 wherein the selected display object is not perceptible in the first workspace; the selected display object being selected by the system user from a plurality of available operations; and the method further includes, after presenting the respective next images on the display in response to the next viewpoint signals, receiving a second signal indicating completion of selected display object coupling; and in response to the second signal, making the selected display object imperceptible in the navigable workspace; and uncoupling the selected display object from the first viewpoint in the navigable workspace.

12. A method of operating a system including a user input device for receiving signals indicating actions and requests of a system user; a display device having a display area for presenting images; a processor connected for receiving the signals from the user input device, and connected for providing images to the display device; and memory for storing data; the processor being further connected for accessing the data stored in the memory; the method comprising:

presenting a first image in the display area of the display device that is perceptible as viewed from a first viewpoint position and from a first viewpoint orientation in a three-dimensional (3D) navigable workspace (hereafter, the workspace); the workspace including a first display object;

receiving a first signal from the user input device selecting the first display object as a selected display object;

in response to the first signal, determining a preferred viewing position and a preferred viewing orientation for the selected display object in the workspace;

presenting on the display a second image of the workspace including the selected display object in the preferred viewing position and in the preferred viewing orientation therein; the second image and the selected display object being perceptible as viewed from the first viewpoint position and from the first orientation in the workspace; and storing display object coupling data indicating that the selected display object is coupled to the first viewpoint position and to the first orientation; the selected display object indicating the display object coupling data;

receiving a sequence of next viewpoint signals from the user input device requesting viewpoint motion in the workspace; each next viewpoint signal indicating a next viewpoint and a next orientation in the workspace that is displaced in the workspace from the next viewpoint and from the next orientation of a preceding next viewpoint signal in the sequence of signals; and in response to receiving each next viewpoint signal, while the display object coupling data indicates that the selected display object is coupled to the first viewpoint position and to the first orientation, storing viewpoint coordinate data indicating the next viewpoint and the next orientation of the preceding next viewpoint signal;

determining an updated display object position and an updated display object orientation in the workspace for the selected display object using the stored viewpoint coordinate data, the next viewpoint and the next orientation; and presenting on the display, a respective next image including the selected display object; the respective next image being perceptible as viewed from the next viewpoint and from the next orientation in the workspace; the selected display object being presented in each respective next image so that the selected display object is perceptible as a moved continuation of the selected display object in a preceding respective next image and is perceptible as being viewed from the first viewpoint position and from the first orientation in the workspace; the selected display object being presented in the updated display object position and in the updated display object orientation in the workspace.

13. The method of claim 12 wherein the first display object is included in the first image and has an original position and an original orientation in the workspace; and wherein the method further includes, after presenting the respective next images on the display in response to the next viewpoint signals, receiving a second signal indicating completion of display object coupling;

and in response to the second signal, modifying the display object coupling data to indicate that the selected display object is not coupled to the first viewpoint position and to the first viewpoint orientation; and modifying the updated display object position and the updated display object orientation for the selected display object to indicate respectively the original position and the original orientation thereof in the navigable workspace.

14. The method of claim 12 wherein the selected display object is an operation display object representing an operation the system user may select for execution.

15. The method of claim 14 wherein the selected display object is not perceptible in the workspace; and wherein the method further includes, making the selected display object perceptible in the preferred viewing position and in the preferred viewing orientation in the workspace in a second image;

and, after presenting the respective next images on the display in response to the next viewpoint signals, receiving a second signal indicating completion of display object coupling;

and in response to the second signal, making the selected display object imperceptible in the workspace;

and modifying the display object coupling data to indicate that the selected display object is not coupled to the first viewpoint position and to the first viewpoint orientation.

16. The method of claim 12 wherein the preferred viewing position of the selected display object in the workspace is determined using a predetermined distance from the first viewpoint position along an axis orthogonal to an image surface of the display; and wherein the preferred viewing orientation of the selected display object in the workspace is a front surface view of the selected display object.

17. A system comprising:

input circuitry, connected to a user input device, for receiving signals indicating actions and requests of a system user;

output circuitry connected to a display device having a display area for presenting images;

a processor connected for receiving the signals from the input circuitry, and connected for providing images to the output circuitry for presentation by the display device; and memory for storing data; the data stored in the memory including instruction data indicating instructions the processor can execute;

the processor being further connected for accessing the data stored in the memory;

the processor, in executing the instructions, presenting a first image on the display that is perceptible as viewed from a first viewpoint in an n-dimensional navigable workspace (hereafter, the workspace); the workspace including a first display object;

the processor further in executing the instructions, receiving a first signal from the system user selecting the first display object as a selected display object;

the processor, further in executing the instructions, storing display object coupling data indicating that the selected display object is coupled to the first viewpoint in response to the first signal;

the processor, further in executing the instructions, receiving a sequence of next viewpoint signals from the user input device requesting viewpoint motion in the workspace; each next viewpoint signal indicating a next viewpoint in the workspace that is displaced in the workspace from the next viewpoint of a preceding next viewpoint signal in the sequence of signals; and the processor, further in executing the instructions, presenting on the display, in response to each next viewpoint signal, a respective next image including the selected display object; the respective next image being perceptible as viewed from the next viewpoint in the workspace; the selected display object being presented in each respective next image so that the selected display object is perceptible as a moved continuation of the selected display object in a preceding respective next image; when the display object coupling data indicates that the selected display object is coupled to the first viewpoint, the selected display object being presented in each respective next image so that the selected display object is perceptible as being viewed from the first viewpoint in the workspace.

18. The method of claim 17 wherein the n-dimensional navigable workspace is a three dimensional (3D) navigable workspace, and wherein the first viewpoint includes a first viewpoint position in the 3D navigable workspace and a first viewpoint orientation in the 3D navigable workspace.

19. The system of claim 17 wherein the processor, further in executing the instructions, after presenting the respective next images on the display in response to the next viewpoint signals, receives a second signal indicating completion of display object coupling;

and in response to the second signal, modifies the display object coupling data to indicate that the selected display object is not coupled to the first viewpoint.

20. The system of claim 17 wherein the first display object is not perceptible in the workspace; wherein the processor, further in executing the instructions in response to the first signal, makes the selected display object perceptible in a second image; and wherein the processor, further in executing the instructions after presenting the respective next images on the display in response to the next viewpoint signals, receives a second signal indicating completion of display object coupling; and in response to the second signal, makes the selected display object imperceptible in the workspace; and modifies the display object coupling data to indicate that the selected display object is not coupled to the first viewpoint.

21. An article of manufacture for use in a system that includes a display having a display area for presenting images to a system user; a user input device for receiving signals indicating actions and requests of the system user; memory for storing data; a storage medium access device for accessing a medium that stores data; and a processor connected for receiving data from the user input device, for providing data defining images to the display, and for accessing the data stored in the memory; the processor further being connected for receiving data from the storage medium access device; the article comprising:

a data storage medium that can be accessed by the storage medium access device when the article is used in the system; and data stored in the data storage medium so that the storage medium access device can provide the stored data to the processor when the article is used in the system; the stored data comprising signal receiving instruction data indicating input instructions the processor can execute to receive signal data from the user input device; the signal data including signals for selecting a first display object included in a navigable workspace and for performing viewpoint motion in the navigable workspace; a first image of the navigable workspace displayed in the display area being perceptible as viewed from a first viewpoint in the navigable workspace; and operation performing instruction data indicating response instructions the processor can execute to perform operations in response to the signal data;

when a first signal indicates the system user's selection of the first display object as a selected display object, execution of the response instructions causing the processor to store display object coupling data indicating that the selected display object is coupled to the first viewpoint; and when a sequence of next viewpoint signals including a series of next viewpoints indicates the system user's request for viewpoint motion in the navigable workspace, execution of the response instructions causing the processor to store viewpoint coordinate data indicating a position of the first viewpoint in the first workspace, and, in response to each next viewpoint signal, to present a respective next image including the selected display object in the display area; the respective next image being perceptible as viewed from the next viewpoint; when the display object coupling data indicates that the selected display object is coupled to the first viewpoint, the selected display object being presented in the respective next image using the viewpoint coordinate data and the next viewpoint so that the selected display object is perceptible as viewed from the first viewpoint.

* * * * *